United States Patent
Onishi et al.

(10) Patent No.: US 9,851,076 B2
(45) Date of Patent: Dec. 26, 2017

(54) LIGHT-EMITTING DEVICE AND MOBILE OBJECT

(71) Applicant: PANASONIC INTELLECTUAL PROPERTY MANAGEMENT CO., LTD., Osaka (JP)

(72) Inventors: Itaru Onishi, Osaka (JP); Osamu Tanahashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 214 days.

(21) Appl. No.: 14/739,365

(22) Filed: Jun. 15, 2015

(65) Prior Publication Data

US 2015/0377456 A1 Dec. 31, 2015

(30) Foreign Application Priority Data

Jun. 30, 2014 (JP) ................................. 2014-134680

(51) Int. Cl.

| F21V 19/00 | (2006.01) |
|---|---|
| F21V 17/00 | (2006.01) |
| F21V 21/00 | (2006.01) |
| F21V 23/00 | (2015.01) |
| B60Q 3/43 | (2017.01) |
| B60Q 3/74 | (2017.01) |

(Continued)

(52) U.S. Cl.
CPC ................ *F21V 19/00* (2013.01); *B60Q 3/43* (2017.02); *B60Q 3/745* (2017.02); *F21W 2101/06* (2013.01); *F21Y 2105/00* (2013.01); *F21Y 2115/20* (2016.08)

(58) Field of Classification Search
CPC . F21V 19/00; F21V 19/0025; F21W 2101/06; B06Q 3/745; B06Q 3/43; F21Y 2115/20
See application file for complete search history.

(56) References Cited

U.S. PATENT DOCUMENTS

| 4,104,555 | A | * | 8/1978 | Fleming | ................ | H05B 33/12 |
|---|---|---|---|---|---|---|
| | | | | | | 313/512 |
| 5,434,013 | A | * | 7/1995 | Fernandez | ................ | B44C 5/00 |
| | | | | | | 313/504 |

(Continued)

FOREIGN PATENT DOCUMENTS

| JP | 2003-280548 | 10/2003 |
|---|---|---|
| JP | 2006-331856 | 12/2006 |

(Continued)

OTHER PUBLICATIONS

U.S. Appl. No. 14/770,519 to Ryusuke Kotera et al., which was filed Aug. 26, 2015.

*Primary Examiner* — Daniel Walsh
(74) *Attorney, Agent, or Firm* — Greenblum & Bernstein, P.L.C.

(57) ABSTRACT

A light-emitting device includes: a holder having an elongate shape and flexibility; and a flat light-emitting element held by the holder and having a rectangular shape and flexibility. The holder includes a frame portion extending in a longitudinal direction of the holder, and a holding part protruding from the frame portion in a plan view. The frame portion of the holder and the flat light-emitting element overlap in a lateral-view direction, and the flat light-emitting element is joined to and held by the holding part.

15 Claims, 18 Drawing Sheets

(51) Int. Cl.
*F21W 101/06* (2006.01)
*F21Y 105/00* (2016.01)
*F21Y 115/20* (2016.01)

(56) References Cited

U.S. PATENT DOCUMENTS

| | | | | |
|---|---|---|---|---|
| 5,661,364 | A * | 8/1997 | Kruskopf | H05B 33/02 313/512 |
| 7,637,641 | B2 * | 12/2009 | Choi | G02F 1/133608 362/224 |
| 8,810,528 | B2 * | 8/2014 | Bita | G02B 6/0055 345/173 |
| 8,952,610 | B2 * | 2/2015 | Rabe | D06M 15/63 313/503 |
| 2001/0017773 | A1 * | 8/2001 | Suzuki | G02F 1/133615 362/23.15 |
| 2002/0001193 | A1 * | 1/2002 | Osawa | F21S 4/00 362/249.14 |
| 2002/0109995 | A1 * | 8/2002 | Tsao | F21V 15/02 362/374 |
| 2004/0032727 | A1 * | 2/2004 | Cok | F21K 9/00 362/84 |
| 2005/0073851 | A1 * | 4/2005 | Itoh | B32B 17/10036 362/487 |
| 2005/0248935 | A1 * | 11/2005 | Strip | G06F 1/1601 362/145 |
| 2006/0023471 | A1 * | 2/2006 | Ahn | G02F 1/133604 362/613 |
| 2006/0139959 | A1 * | 6/2006 | Bae | G02F 1/133604 362/615 |
| 2006/0237585 | A1 * | 10/2006 | Lau | B64D 11/00 244/118.5 |
| 2007/0001709 | A1 * | 1/2007 | Shen | H01L 24/73 362/84 |
| 2007/0064378 | A1 * | 3/2007 | Lo | G02F 1/133308 361/679.22 |
| 2007/0109802 | A1 * | 5/2007 | Bryan | B64D 11/00 362/471 |
| 2007/0201225 | A1 * | 8/2007 | Holder | F21K 9/00 362/227 |
| 2007/0217192 | A1 * | 9/2007 | Hiratsuka | F21V 17/164 362/241 |
| 2007/0217223 | A1 * | 9/2007 | Ha | G02F 1/133308 362/614 |
| 2007/0262700 | A1 * | 11/2007 | Satomi | H05B 33/22 313/498 |
| 2008/0106667 | A1 * | 5/2008 | Fukuda | G02F 1/133308 349/58 |
| 2008/0170416 | A1 * | 7/2008 | Yuan | G02B 6/0088 362/633 |
| 2008/0173257 | A1 * | 7/2008 | Steiner | A01K 27/004 119/796 |
| 2008/0291365 | A1 * | 11/2008 | Woo | G02B 6/0083 349/65 |
| 2009/0059562 | A1 * | 3/2009 | Maniwa | G02F 1/133604 362/97.1 |
| 2009/0273919 | A1 * | 11/2009 | Park | G02F 1/133604 362/97.1 |
| 2010/0046210 | A1 * | 2/2010 | Mathai | H01L 51/52 362/147 |
| 2010/0157192 | A1 * | 6/2010 | Harada | G02F 1/133608 349/58 |
| 2011/0043719 | A1 * | 2/2011 | Thunhorst | G02F 1/133308 349/58 |
| 2011/0095701 | A1 * | 4/2011 | Tanahashi | H01L 51/5203 315/291 |
| 2011/0267840 | A1 * | 11/2011 | Wu | G09F 13/22 362/611 |
| 2012/0092889 | A1 * | 4/2012 | Held | B60Q 1/26 362/606 |
| 2012/0262643 | A1 * | 10/2012 | Kweon | G02B 6/0091 349/58 |
| 2013/0119368 | A1 * | 5/2013 | Nakamura | H01L 51/5228 257/40 |
| 2013/0278611 | A1 * | 10/2013 | Holman | G02B 6/0046 345/501 |
| 2014/0217381 | A1 * | 8/2014 | Vogt | F21V 19/0025 257/40 |
| 2014/0240961 | A1 * | 8/2014 | Tsubaki | H05K 7/00 362/97.1 |
| 2014/0247584 | A1 * | 9/2014 | Kodama | H01L 27/3227 362/183 |
| 2015/0034931 | A1 * | 2/2015 | Matsuda | H01L 27/3288 257/40 |
| 2015/0062927 | A1 * | 3/2015 | Hirakata | H01L 51/0097 362/362 |
| 2015/0151675 | A1 * | 6/2015 | Lefevre | B32B 17/10 362/520 |
| 2015/0151679 | A1 * | 6/2015 | Aruga | B64D 47/02 362/470 |
| 2015/0377456 | A1 * | 12/2015 | Onishi | F21V 19/00 362/470 |
| 2016/0178135 | A1 * | 6/2016 | Xu | F21V 25/04 362/223 |
| 2016/0320027 | A1 * | 11/2016 | Ito | H05B 33/145 |

FOREIGN PATENT DOCUMENTS

| | | |
|---|---|---|
| JP | 2010-140831 | 6/2010 |
| JP | 2012-015000 | 1/2012 |
| JP | 2012-054184 | 3/2012 |
| JP | 2012-064442 | 3/2012 |
| JP | 2013-229258 | 11/2013 |

* cited by examiner

LIGHT-EMITTING DEVICE AND MOBILE OBJECT

CROSS REFERENCE TO RELATED APPLICATION

This application claims the benefit of priority of Japanese Patent Application Number 2014-134680, filed Jun. 30, 2014, the entire content of which is hereby incorporated by reference.

BACKGROUND OF THE INVENTION

1. Field of the Invention

The present disclosure relates to a light-emitting device and a mobile object provided with the light-emitting device.

2. Description of the Related Art

An organic EL (electro luminescence) panel which is a flat light-emitting element is included in various light-emitting devices. Since the organic EL panel is thin and thus has flexibility, it is possible to create a curved light emitting surface. A light-emitting device including such a flexible organic EL panel can be curved and thereby attached to a curved portion of a mobile object or a structural object.

In recent years, an illumination apparatus, a signage, a display apparatus, etc. have been proposed as a light-emitting device including the above-described organic EL panel having flexibility. A light-emitting device of this type includes a flat organic EL panel having flexibility and a flat supporting substrate having flexibility which supports the organic EL panel, which are bonded together (see, for example, Japanese Unexamined Patent Application Publication No. 2003-280548).

SUMMARY OF THE INVENTION

It is possible to curve a flat light-emitting element having flexibility, such as an organic EL panel. Accordingly, it is possible to create greater variations as a light-emitting device, by employing the flat light-emitting element.

However, a conventionally-used flat light-emitting element is bonded to a flat plate supporting substrate in a face to face manner. For that reason, there are instances where misalignment or the like occurs in the flat light-emitting element and the supporting substrate when the light-emitting device as a whole is curved, leading to damage or clack in the flat light-emitting element.

The present disclosure has been conceived to solve the above-described problem, and an object of the present disclosure is to provide a light-emitting device and a mobile object having a flat light-emitting element which are less likely to be damaged even when the light-emitting device is curved.

In order to solve the above-described problem, an aspect of a light-emitting device according to the present disclosure includes: a holder having an elongate shape and flexibility; and a flat light-emitting element held by the holder and having a rectangular shape and flexibility, wherein the holder includes a frame portion extending in a longitudinal direction of the holder, and a holding part protruding from the frame portion in a plan view, the frame portion of the holder and the flat light-emitting element overlap in a lateral-view direction, and the flat light-emitting element is joined to and held by the holding part.

According to the present disclosure, it is possible to prevent damage to the flat light-emitting element even when the flat light-emitting element is curved.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE PREFERRED EMBODIMENTS

An exemplary embodiment according to the present disclosure will be described below with reference to the drawings. It should be noted that each of the exemplary embodiments described below shows a preferable specific example. Thus, the numerical values, shapes, materials, constituent elements, the disposition and connection of the constituent elements, and others described in the following exemplary embodiments are mere examples, and do not intend to limit the present disclosure. Therefore, among the constituent elements in the following exemplary embodiments, constituent elements not recited in any one of the independent claims which represent the most generic concepts of the present disclosure are described as arbitrary constituent elements.

In addition, each of the diagrams is a schematic diagram and thus is not necessarily strictly illustrated. In each of the diagrams, substantially the same constituent elements are assigned with the same reference signs, and redundant descriptions will be omitted or simplified.

(First Exemplary Embodiment)

Figure 1:
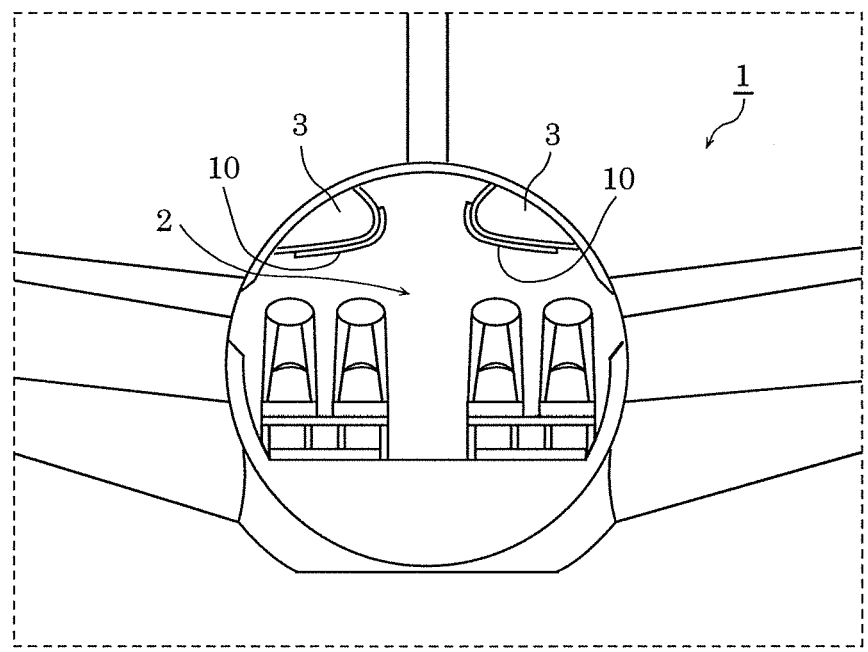
FIG. 1 is a cross-sectional front view of an airplane according to the first exemplary embodiment.
Figure 2A:
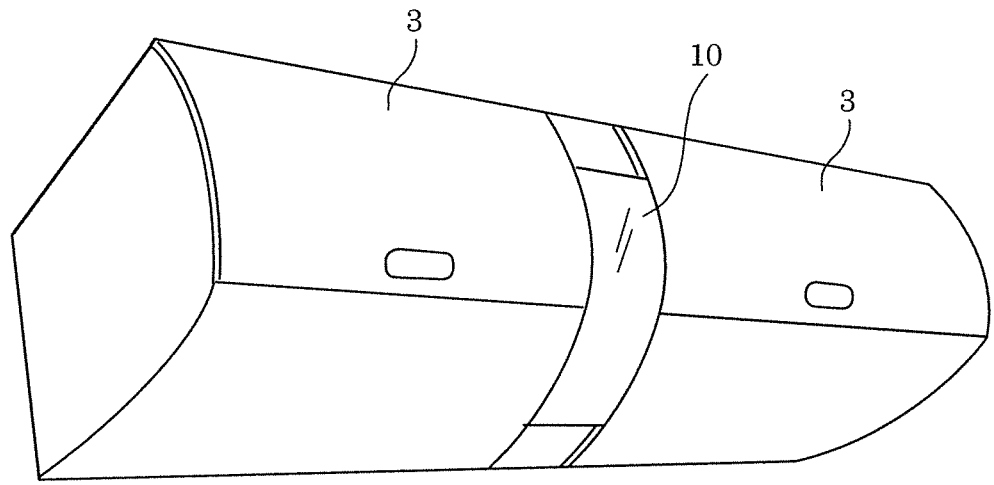
FIG. 2A is a perspective view of a luggage compartment provided in the airplane according to the first exemplary embodiment.

First, airplane 1 according to the first exemplary embodiment of the present disclosure will be described with reference to FIG. 1, FIG. 2A, and FIG. 2B. FIG. 1 is a cross-sectional front view of the airplane according to the first exemplary embodiment. FIG. 2A is a perspective view of a luggage compartment provided in the airplane, and FIG. 2B is a cross-sectional view of the luggage compartment and a light-emitting device illustrated in FIG. 2A.

As illustrated in FIG. 1, airplane (aircraft) 1 according to the present exemplary embodiment is an example of a mobile object, and includes luggage compartment 3 provided on an upper part of passenger cabin (room) 2. Luggage compartment 3 which is openable and closable includes a housing for storing a baggage, etc. of a passenger, and a door attached to a front opening of the housing. An outer surface of luggage compartment 3 is a curved surface which is curved as a whole from a portion facing a floor toward a ceiling of passenger cabin 2.

Figure 2B:
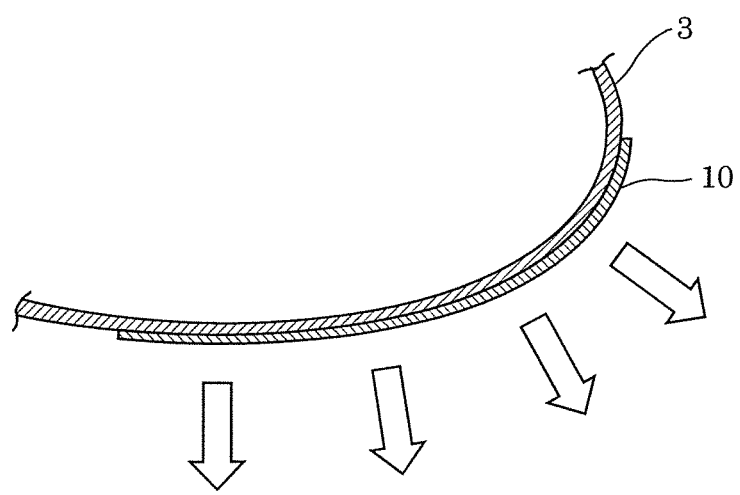
FIG. 2B is a cross-sectional view of the luggage compartment and a light-emitting device illustrated in FIG. 2A.

As shown in FIG. 1, FIG. 2A, and FIG. 2B, light-emitting device 10 is provided on the curved surface of luggage compartment 3. More specifically, light-emitting device 10 is a thin illumination apparatus having an elongate shape, and attached to a curved portion (curved surface) of luggage compartment 3 in a curved manner. With this configuration, light-emitting device 10 has a curved luminous surface, and thus lights an inside of passenger cabin 2 with a wide light distribution angle toward a lower part and a lateral part of passenger cabin 2. Light-emitting device 10 emits, for example, white light as illumination light.

Figure 3A:
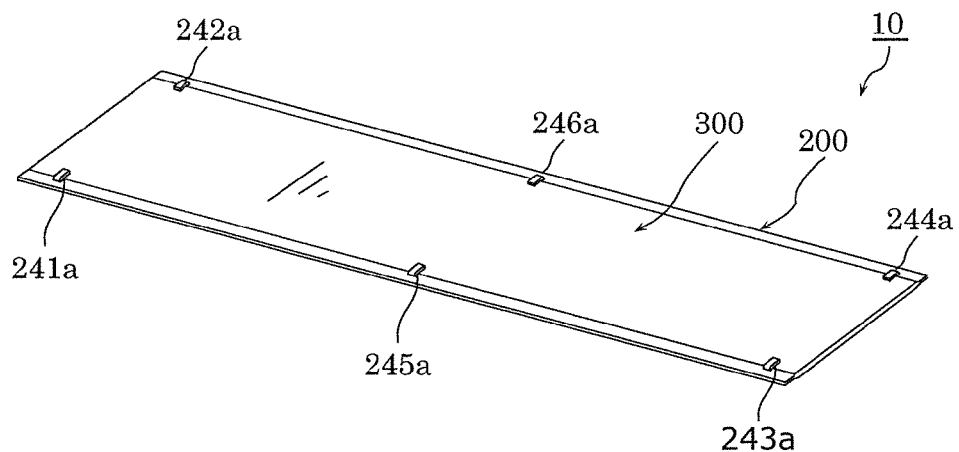
FIG. 3A is a perspective view of the light-emitting device according to the first exemplary embodiment.
Figure 3B:
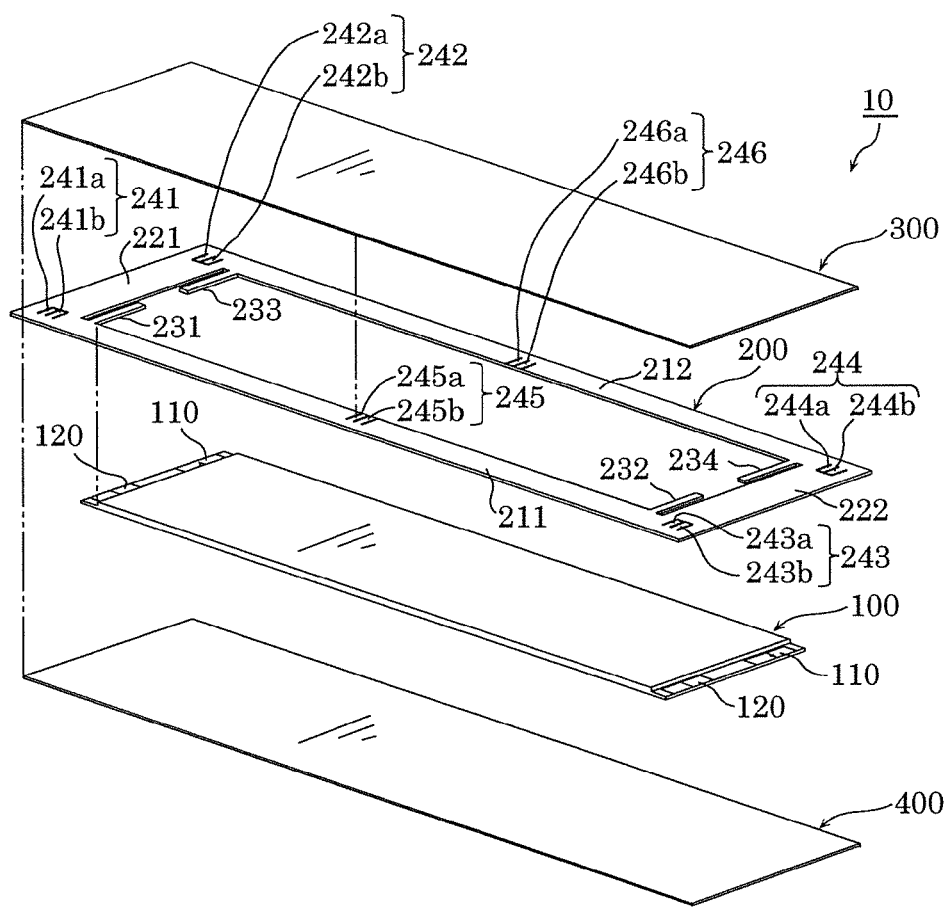
FIG. 3B is an exploded perspective view of the light-emitting device according to the first exemplary embodiment.
Figure 3C:
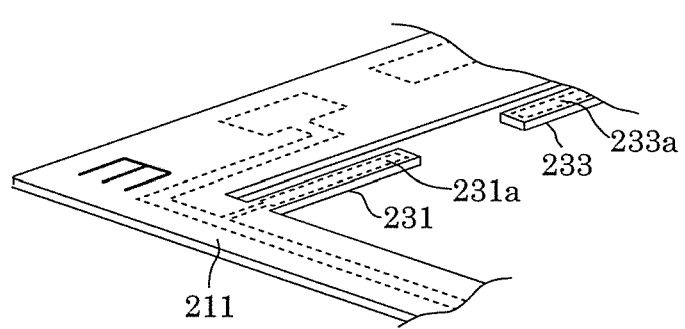
FIG. 3C is an enlarged perspective view of a holder in the light-emitting device according to the first exemplary embodiment.
Figure 4A:
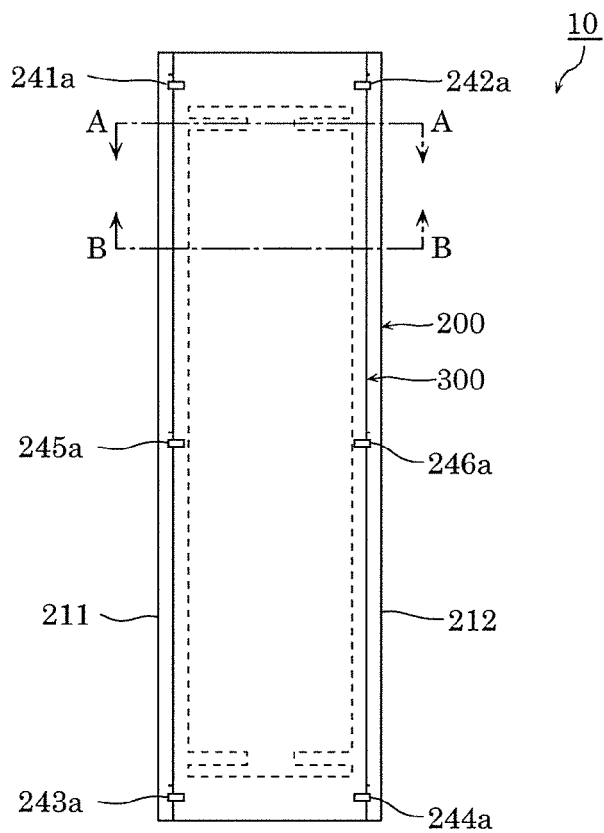
FIG. 4A is a plan view of the light-emitting device according to the first exemplary embodiment.
Figure 4B:
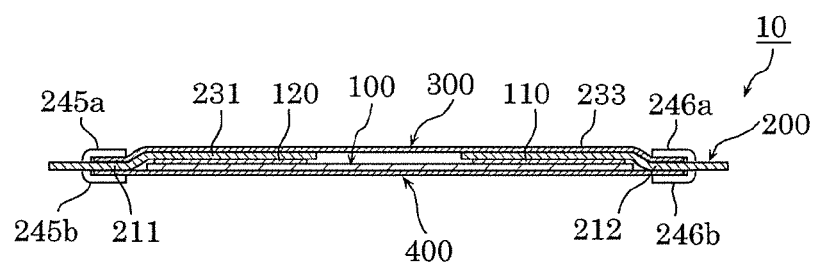
FIG. 4B is a cross-sectional view of the light-emitting device according to the first exemplary embodiment along the line A-A in FIG. 4A.
Figure 4C:
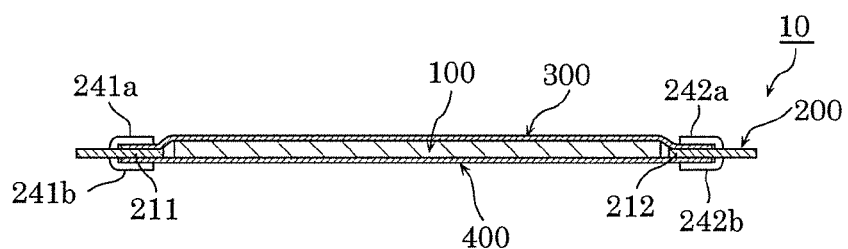
FIG. 4C is a cross-sectional view of the light-emitting device according to the first exemplary embodiment along the line B-B in FIG. 4A.

Next, light-emitting device 10 according to the first exemplary embodiment will be described with reference to FIG. 3A, FIG. 3B, FIG. 3C, FIG. 4A, FIG. 4B, and FIG. 4C. FIG. 3A is a perspective view of a light-emitting device according to the first exemplary embodiment, FIG. 3B is an exploded perspective view of the light-emitting device, and FIG. 3C is an enlarged perspective view of a holder of the light-emitting device. In addition, FIG. 4A is a plan view of the light-emitting device, FIG. 4B is a cross-sectional view along the line A-A of FIG. 4A, and FIG. 4C is a cross-sectional view along the line B-B of FIG. 4A.

Light-emitting device 10 according to the present exemplary embodiment is a thin illumination apparatus having flexibility and an elongate shape, and can be curved along the longitudinal direction by being subjected to stress. Thus, light-emitting device 10 is flat when not subjected to stress as shown in FIG. 3A. According to the present exemplary embodiment, light-emitting device 10 has an elongate rectangular shape in a plan view.

As illustrated in FIG. 3A and FIG. 3B, light-emitting device 10 includes flat light-emitting element 100 and holder 200, and further includes first cover 300 and second cover 400 according to the present exemplary embodiment. In light-emitting device 10, flat light-emitting element 100 and holder 200 are sandwiched between first cover 300 and second cover 400.

Flat light-emitting element 100 is a planer light-emitting member (planer light-emitting element) having flexibility and an elongate shape. Flat light-emitting element 100 is, for example, rectangle in a plan view. Flat light-emitting element 100 according to the present exemplary embodiment is an organic EL panel of a self-light-emitting type, and includes: a repeller (cathode, for example) including metal, etc.; an EL layer including a light-emitting layer; a transparent electrode (anode, for example) including indium tin oxide (ITO), etc.; and a second substrate including glass, transparent resin, or the like, stacked sequentially on a first substrate such as a flexible substrate, for example.

The first substrate of flat light-emitting element 100 is a wiring board, and a metal line having a predetermined shape is formed on the first substrate. Furthermore, in the longitudinal direction, the first substrate is longer than the second substrate, and both end portions in the longitudinal direction of the first substrate are exposed as illustrated in FIG. 3B. More specifically, the both end portions in the longitudinal direction of flat light-emitting element 100 are thin-wall parts which are thinner than other parts, and a stepped portion is provided at each of the both end portions in the longitudinal direction of flat light-emitting element 100.

As shown in FIG. 3B, flat light-emitting element 100 includes a pair of power supply electrodes 110 and 120. The pair of power supply electrodes 110 and 120 is an extraction electrode (Au land) provided at an exposed portion of the first substrate of flat light-emitting element 100 (thin-wall part of flat light-emitting element 100), and electrically connected to the metal line of the first substrate.

For example, power supply electrodes 110 are each a metal electrode of a high-voltage side (plus side), and electrically connected to an anode via the metal line by ACF (anisotropic conductive film) pressure bonding or the like. Meanwhile, power supply electrodes 120 are each a metal electrode of a low-voltage side (minus side), and electrically connected to a cathode via the metal line by ACF pressure bonding or the like. According to the present exemplary embodiment, the pair of power supply electrodes 110 and 120 is disposed on each of the both end portions in the longitudinal direction of the first substrate of flat light-emitting element 100, as illustrated in FIG. 3B.

The pair of power supply electrodes 110 and 120 is electrically and mechanically connected to power supply units disposed on holding parts 231 to 234 of holder 200. As illustrated in FIG. 3B and FIG. 4B, for example, the pair of power supply electrodes 110 and 120 disposed on one of the both ends in the longitudinal direction of flat light-emitting element 100 is electrically and mechanically connected to power supply units (not illustrated) disposed on holding parts 231 and 233 of holder 200. With this configuration, flat light-emitting element 100 emits light by receiving power supply from holder 200 via the pair of power supply electrodes 110 and 120. Flat light-emitting element 100, for example, emits white light.

As illustrated in FIG. 3B, holder 200 is a flat holding member which holds flat light-emitting element 100. According to the present exemplary embodiment, holder 200 is a film member having flexibility and an elongate shape as a whole, and is a flexible substrate including a resin material etc., such as polyimide, for example. It is to be noted that the longitudinal direction of holder 200 is the same direction as the longitudinal direction of flat light-emitting element 100.

In addition, holder 200 is a wiring board on which a metal line having a predetermined shape is disposed, and is a relay wiring board for supplying flat light-emitting element 100 with power received from outside light-emitting device 10. Accordingly, holder 200 includes, for example, an externally-connected electrode for receiving power from outside.

According to the present exemplary embodiment, holder 200 has a shape of a rectangular frame (shape of a hollow rectangle) in a plan view, which is a shape surrounding four sides of flat light-emitting element 100. More specifically, holder 200 includes: a pair of frame portions (first side frame portions) 211 and 212 which extend along the longitudinal direction of holder 200; and a pair of frame portions (second side frame portions) 221 and 222 which extend along the shorter side direction of holder 200. More specifically, each of the pair of frame portions 211 and 212 is a long side frame and each of the pair of frame portions 221 and 222 is a short side frame, and holder 200 includes these four frames which are coupled together.

Flat light-emitting element 100 is disposed within holder 200 having the shape of hollow rectangle including the four frames. In other words, each of frame portions 211, 212, 221, and 222 includes a side surface which faces a side surface of flat light-emitting element 100.

Frame portions 211, 212, 221, and 222 are each have a laminar shape of an elongate rectangle in a plan view. In addition, frame portions 211, 212, 221, and 222 are each have the same thickness.

In addition, holder 200 includes holding parts 231, 232, 233, and 234 which hold flat light-emitting element 100. Flat light-emitting element 100 is joined to holding parts 231 to 234, and thereby held by holder 200.

Holding parts 231 to 234 are protruding portions each of which protrudes from frame portion 211 or frame portion 212, and protrudes from the side of frame portions 211 or frame portion 212 toward inside holder 200, according to the present exemplary embodiment. Flat light-emitting element 100 is held by four holding parts 231 to 234.

More specifically, each of holding parts 231 and 232 is formed by extending part of frame portion 211 so as to protrude from the side of frame portion 211 in the longitudinal side toward frame portion 212 which is opposite frame portion 211. Each of holding parts 231 and 232 is disposed at a corresponding one of the both end portions of frame portion 211 in the longitudinal direction.

According to the present exemplary embodiment, holding parts 231 and 232 each have an elongate rectangular shape in a plan view. In addition, the longitudinal direction of holding parts 231 and 232 is perpendicular to the longitudinal direction of frame portion 211.

The width of holding parts 231 and 232 (the length of holding parts 231 and 232 in the shorter side direction) is sufficiently smaller than the length of holder 200 (frame portion 211) in the longitudinal direction. In other words, the width of holding parts 231 and 232 is sufficiently smaller than the length of flat light-emitting element 100 in the longitudinal direction.

The width of holding parts 231 and 232 needs to be, for example, at most one-fifth of the length of flat light-emitting element 100 in the longitudinal direction. According to the present exemplary embodiment, the ratio of the width of holding parts 231 and 232 to the length of flat light-emitting element 100 in the longitudinal direction is 1 to 70. It is to be noted that the thickness of holding parts 231 and 232 is the same as the thickness of frame portion 211.

In the same manner as above, each of holding parts 233 and 234 is formed by extending part of frame portion 212 so as to protrude from the side of frame portion 212 in the longitudinal side toward frame portion 211 which is opposite frame portion 212. Each of holding parts 233 and 234 is disposed at a corresponding one of the both end portions of frame portion 212 in the longitudinal direction.

According to the present exemplary embodiment, holding parts 233 and 234 each have an elongate rectangular shape in a plan view, as with holding parts 231 and 232. In addition, the longitudinal direction of holding parts 233 and 234 is perpendicular to the longitudinal direction of frame portion 212.

As with holding parts 231 and 232, the width of holding parts 233 and 234 (the length of holding parts 233 and 234 in the shorter side direction) is sufficiently smaller than the length of holder 200 (frame portion 212) in the longitudinal direction. In sum, the width of holding parts 233 and 234 is sufficiently smaller than the length of flat light-emitting element 100 in the longitudinal direction.

The width of holding parts 233 and 234 needs to be, for example, at most one-fifth of the length of flat light-emitting element 100 in the longitudinal direction. According to the present exemplary embodiment, the width of holding parts 233 and 234 is the same as the width of holding parts 231 and 232. It is to be noted that the thickness of holding parts 233 and 234 is the same as the thickness of frame portion 212.

Holding parts 231 to 234 are each provided with a power supply unit (power supply body) capable of supplying power to flat light-emitting element 100. For example, as illustrated in FIG. 3C, power supply unit 231a and power supply unit 233a are disposed on the back surfaces of holding parts 231 and 233, respectively.

Power supply unit 231a is electrically and mechanically connected to power supply electrode 120 of flat light-emitting element 100. More specifically, in the region where holding part 231 of holder 200 is joined to flat light-emitting element 100, power supply electrode 120 provided at one end of flat light-emitting element 100 in the longitudinal direction is electrically and mechanically connected to power supply unit 231*a*. For example, power supply unit 231*a* and power supply electrode 120 may be indirectly connected via a conductive adhesive such as solder (by solder jointing), or may be directly connected by ultrasonic jointing, welding, or the like.

In the same manner as above, power supply unit 233*a* is electrically and mechanically connected to power supply electrode 110 of flat light-emitting element 100. More specifically, in the region where holding part 233 of holder 200 is joined to flat light-emitting element 100, power supply electrode 110 provided at one of the both end portions of flat light-emitting element 100 in the longitudinal direction is electrically and mechanically connected to power supply unit 233*a*. Power supply unit 233*a* and power supply electrode 110 may be indirectly connected via a conductive adhesive such as solder (by solder jointing), or may be directly connected by ultrasonic jointing, welding, or the like.

When joining holding part 231 (or 233) and power supply electrode 120 (or 110) of flat light-emitting element 100, holding part 231 (or 233) overlaps a thin-wall part defined at a corresponding one of the both end portions in the longitudinal direction of flat light-emitting element 100, as illustrated in FIG. 4B. In this case, holding part 231 (or 233) is bent at a connecting portion (root) with frame portion 211 (or 212) so as to mount on the first substrate of flat light-emitting element 100. With this configuration, it is possible to cause holder 200 to hold flat light-emitting element 100 without partially increasing the thickness of the region where holder 200 and flat light-emitting element 100 are joined together.

Although not illustrated, holding parts 232 and 234 are each provided with a power supply unit which is electrically and mechanically connected to the power supply electrode disposed at the other of the both end portions of flat light-emitting element 100 in the longitudinal direction, in the same manner as holding parts 231 and 233.

As described above, power supply electrodes 110 and 120 of flat light-emitting element 100 and power supply units of holding parts 231 to 234 are joined in one-to-one correspondence. It is to be noted that power supply units of holding parts 231 to 234 are each connected to a metal line formed on holder 200 in a predetermined shape, and electrically connected to an externally-connected electrode via the metal line. For example, as illustrated in FIG. 3C, power supply unit 231*a* of holding part 231 and power supply unit 233*a* of holding part 233 are each connected to the externally-connected electrode via the metal line.

In addition, as illustrated in FIG. 3B, holder 200 is provide with six holding pieces (cover holding parts) 241, 242, 243, 244, 245, and 246 for holding first cover 300. According to the present exemplary embodiment, holding pieces 241 to 246 hold not only first cover 300 but also second cover 400.

Holding pieces 241 to 246 are each formed integrally with holder 200, and formed by making a slit in part of holder 200 according to the present exemplary embodiment.

More specifically, holding piece 241 includes a pair of first holding piece 241*a* and second holding piece 241*b* which are formed by making a slit of an E-shape in holder 200. It is to be noted that holding pieces 242, 243, 244, 245, and 246 each also have a configuration equivalent to a configuration of holding piece 241. More specifically, holding piece 242 includes a pair of first holding piece 242*a* and second holding piece 242*b*, holding piece 243 includes a pair of first holding piece 243*a* and second holding piece 243*b*, holding piece 244 includes a pair of first holding piece 244*a* and second holding piece 244*b*, holding piece 245 includes a pair of first holding piece 245*a* and second holding piece 245*b*, and holding piece 246 includes a pair of first holding piece 246*a* and second holding piece 246*b*.

According to the present exemplary embodiment, holding pieces 241, 243, and 245 are disposed in frame portion 211. Among holding pieces 241, 243, and 245, holding pieces 241 and 243 are disposed at an end portion in the longitudinal direction of frame portion 211; that is, a corner portion of holder 200, and holding piece 245 is disposed at a center portion in the longitudinal direction of frame portion 211.

In addition, holding pieces 242, 244, and 246 are disposed at frame portion 212. Among holding pieces holding pieces 242, 244, and 246, holding pieces 242 and 244 are disposed at an end portion in the longitudinal direction of frame portion 212; that is, a corner portion of holder 200, and holding piece 246 is disposed at a center portion in the longitudinal direction of frame portion 212.

When first cover 300 and second cover 400 are held by holder 200 using holding pieces 241 to 246, the first holding piece fastens a surface of first cover 300 and the second holding piece fastens a surface of second cover 400, in each of holding pieces 241 to 246.

For example, in holding piece 241 as illustrated in FIG. 4A, FIG. 4B, and FIG. 4C, first holding piece 241*a* is pushed out along a thickness direction to fasten the surface of first cover 300 with first holding piece 241*a*, and second holding piece 241*b* is pushed out along a thickness direction opposite to the thickness direction along which first holding piece 241*a* is pushed out, to fasten the surface of second cover 400 with second holding piece 241*b*. With this configuration, it is possible to hold first cover 300 and second cover 400 by first holding piece 241*a* and second holding piece 241*b* which sandwich first cover 300 and second cover 400 with use of suppress strength caused by an elastic restoring force of first holding piece 241*a* and second holding piece 241*b*.

It is to be noted that holding pieces 242 to 246 are also capable of holding first cover 300 and second cover 400 in the same manner as holding piece 241.

First cover 300 is a protection cover (covering) which covers one of the surfaces of flat light-emitting element 100, and is a flat plate having flexibility and a rectangular shape, for example. According to the present exemplary embodiment, first cover 300 is a front cover which covers a surface on the light-emitting side (luminous surface) of flat light-emitting element 100. Therefore, first cover 300 is formed using a transmissive material. First cover 300 is a resin substrate including a transmissive resin material such as polycarbonate, polyethylene terephthalate, and acrylic, or is a glass substrate including a transparent glass material. According to the present exemplary embodiment, first cover 300 is a transparent resin substrate. It is to be noted that diffusion treatment may be applied to first cover 300, as necessary.

In addition, first cover 300 covers not only flat light-emitting element 100 but also holder 200. According to the present exemplary embodiment, first cover 300 entirely covers flat light-emitting element 100 and holder 200. In other words, first cover 300 is larger than flat light-emitting element 100 and holder 200 in plan view. It is to be noted that first cover 300 may cover not all of flat light-emitting element 100 and holder 200 but part of each of flat light-emitting element 100 and holder 200.

Second cover 400 is a protection cover (covering) which covers the other surface of flat light-emitting element 100, and is a flat plate having flexibility and a rectangular shape, for example. According to the present exemplary embodiment, second cover 400 is a back cover which covers a surface on a side opposite to the light-emitting side of flat light-emitting element 100. Therefore, second cover 400 may be formed using a non-transmissive (or low-transmissive) material, or may be formed using a transmissive material as with first cover 300.

According to the present exemplary embodiment, second cover 400 is a transparent resin substrate as with first cover 300 and has the same shape and size as those of first cover 300. However, second cover 400 may be different from first cover 300 in shape or size.

In addition, it is preferable to avoid bonding first cover 300 and second cover 400 with flat light-emitting element 100 and holder 200 using adhesives or the like. According to the present exemplary embodiment, both of first cover 300 and second cover 400, flat light-emitting element 100, and holder 200 are held so as to be able to move independently of each other when light-emitting device 10 is curved. In other words, first cover 300 and second cover 400 are held slidably with respect to flat light-emitting element 100 and holder 200.

In light-emitting device 10 configured as described above, flat light-emitting element 100 is held by holder 200. In light-emitting device 10 in this case, frame portions 211 and 212 of holder 200 and flat light-emitting element 100 overlap in a lateral-view direction of light-emitting device 10 as illustrated in FIG. 4C. In the same manner as above, frame portions 221 and 222 of holder 200 and flat light-emitting element 100 overlap in a lateral-view direction of light-emitting device 10. In other words, when light-emitting device 10 is viewed in cross-section, frame portions 211, 212, 221, and 222 of holder 200 and flat light-emitting element 100 are not stacked in the thickness direction.

According to the present exemplary embodiment, each of frame portions 211, 212, 221, and 222 of holder 200 and flat light-emitting element 100 are arranged so as to flush with each other, and thus overlap in the lateral-view direction.

As described above, in light-emitting device 10 according to the present exemplary embodiment, flat light-emitting element 100 is joined to and held by holder 200; however, frame portions 211, 212, 221, and 222 and flat light-emitting element 100 are not stacked in the thickness direction, and holder 200 and flat light-emitting element 100 are stacked only in regions where holding parts 231 to 234 are joined to flat light-emitting element 100. In other words, holder 200 and flat light-emitting element 100 are joined together only by holding parts 231 to 234.

In addition, it is preferable that each of frame portions 211, 212, 221, and 222 of holder 200 and flat light-emitting element 100 completely overlap, from one to the other, in the lateral-view direction of light-emitting device 10. For example, according to the present exemplary embodiment, frame portions 211, 212, 221, and 222 completely overlap flat light-emitting element 100 as illustrated in FIG. 4C, etc. More specifically, the maximum thickness of each of frame portions 211, 212, 221, and 222 is smaller than the maximum thickness of flat light-emitting element 100, so that each of frame portions 211, 212, 221, and 222 of holder 200 does not protrude from flat light-emitting element 100 in the lateral-view direction of light-emitting device 10.

Figure 5A:
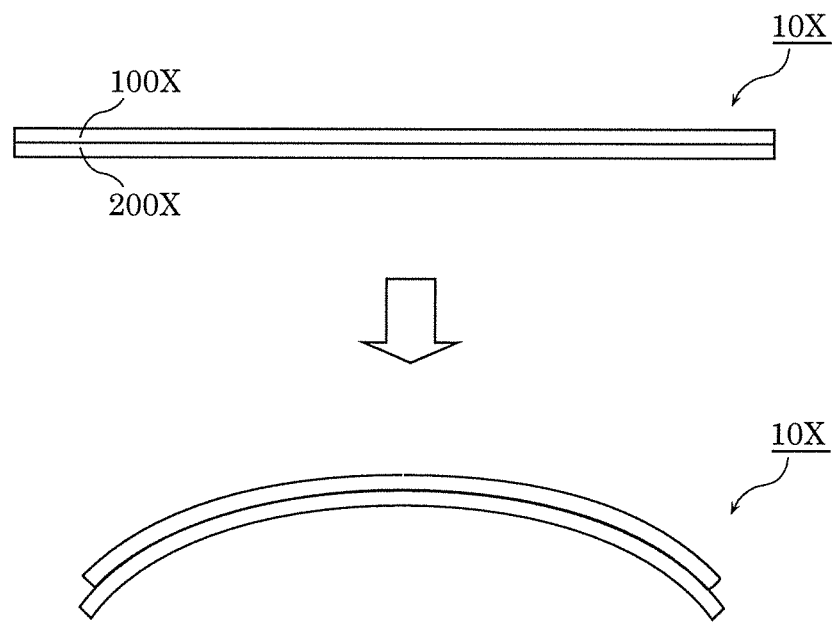
FIG. 5A is a side face view schematically illustrating the state where a light-emitting device of a comparison example is curved.
Figure 5B:
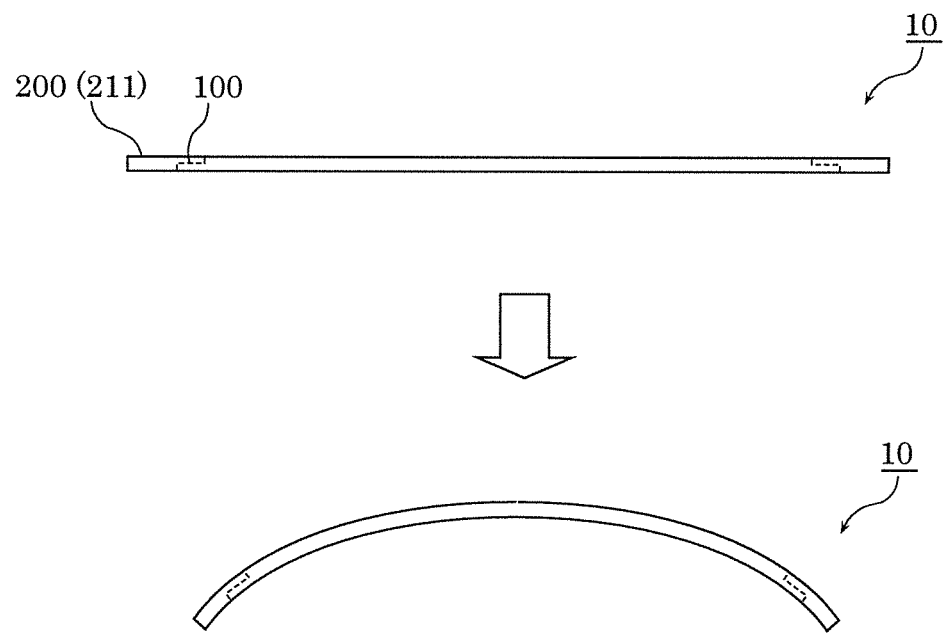
FIG. 5B is a side face view schematically illustrating the state where the light-emitting device according to the first exemplary embodiment is curved.

Next, an operation and effect of light-emitting device 10 according to the present exemplary embodiment will be described with reference to FIG. 5A and FIG. 5B. FIG. 5A is a side face view schematically illustrating the state where a light-emitting device of a comparison example is curved, and FIG. 5B is a side face view schematically illustrating the state where the light-emitting device according to the first exemplary embodiment is curved. It is to be noted that, in FIG. 5B, illustration of first cover 300 and second cover 400 is omitted.

As illustrated in FIG. 5A, in light-emitting device 10X of the comparison example, flat light-emitting element 100X and supporting substrate 200X which is flat and holds flat light-emitting element 100X are bonded so as to face each other. In other words, flat light-emitting element 100X and supporting substrate 200X overlap in the thickness direction as a whole.

For that reason, when light-emitting device 10X is curved and each of flat light-emitting element 100X and supporting substrate 200X bends to curve and deform, deformation of one of flat light-emitting element 100X and supporting substrate 200X interferes with deformation of the other due to a difference in the curvature caused when light-emitting device 10X is curved. In other words, deformation of one of flat light-emitting element 100X and supporting substrate 200X follows deformation of the other.

As a result, as illustrated in FIG. 5A, there are instances where flat light-emitting element 100X and supporting substrate 200X are misaligned, or part of flat light-emitting element 100X or supporting substrate 200X expands, causing a chip, crack, etc., leading to damage to flat light-emitting element 100X or supporting substrate 200X. In particular, flat light-emitting element 100X are damaged in some cases.

In contrast, in light-emitting device 10 according to the present exemplary embodiment, although flat light-emitting element 100 is held by holder 200, each of frame portions 211, 212, 221, and 222 of holder 200 and flat light-emitting element 100 overlap not in the thickness direction but in the lateral-view direction of light-emitting device 10, as described above.

For that reason, as illustrated in FIG. 5B, even when light-emitting device 10 is curved and each of flat light-emitting element 100 and holder 200 bends to curve and deform, deformation of one of flat light-emitting element 100 and holder 200 does not interfere with deformation of the other. More specifically, flat light-emitting element 100 and frame portion 211 (211, 221, and 222) each bend to curve and deform independently, and flat light-emitting element 100 and holder 200 (frame portions 211, 212, 221, and 222) bend to curve and deform at approximately the same curvature. With this, it is possible to prevent flat light-emitting element 100 and holder 200 from being misaligned, and thus it is possible to prevent damage to flat light-emitting element 100 and holder 200.

As described above, in light-emitting device 10 according to the present exemplary embodiment, flat light-emitting element 100 having flexibility is held by holder 200 having flexibility and an elongate shape, and thus it is possible to readily change flat light-emitting element 100 from a flat state to a curved state.

With this, light-emitting device 10 is flat before installation and thus easy to handle in manufacturing, transporting, conveying, etc., and it is possible, by curving light-emitting device 10 at the time of installation, to readily be attached to a curved portion (curved surface) of a structure. Accordingly, it is possible to implement a light-emitting device which is highly versatile for installation.

In addition, in light-emitting device 10 according to the present exemplary embodiment, each of frame portions 221, 212, 221, and 222 of holder 200 and flat light-emitting element 100 overlap in the lateral-view direction.

With this configuration, it is possible to curve light-emitting device 10 without damaging flat light-emitting element 100 and holder 200, as described above.

In addition, it is preferable that each of frame portions 211, 212, 221, and 222 of holder 200 and flat light-emitting element 100 completely overlap, from one to the other, in the lateral-view direction of light-emitting device 10.

With this configuration, it is possible to further prevent misalignment between holder 200 and flat light-emitting element 100 when light-emitting device 10 is caused to curve and deform, allowing further preventing damage to flat light-emitting element 100.

In addition, in light-emitting device 10 according to the present exemplary embodiment, holder 200 and flat light-emitting element 100 are joined not by frame potions 211, 212, 221, and 222 but by holding parts 231, 232, 233, and 234 which protrude from the sides of frame potions 211 and 212. More specifically, power supply electrodes 110 and 120 of flat light-emitting element 100 and power supply units disposed on holding parts 231 to 234 of holder 200 are electrically and mechanically connected.

With this configuration, power supply to flat light-emitting element 100 is not interfered with, even when light-emitting device 10 is curved. In other words, holder 200 according to the present exemplary embodiment is capable of realizing both power supply to flat light-emitting element 100 and holding of flat light-emitting element 100, without causing a damage to flat light-emitting element 100, even when light-emitting device 10 is curved in installation.

In addition, in light-emitting device 10 according to the present exemplary embodiment, the width of each of holding parts 231, 232, 233, and 234 of holder 200 is sufficiently smaller than the length of holder 200 (frame portions 211 and 212) in the longitudinal direction.

Flat light-emitting element 100 and holder 200 are overlapped in frame portions 211, 212, 221, and 222 in a lateral-view direction; however, not overlapped in holding parts 231, 232, 233, and 234 in a lateral-view direction of light-emitting device 10 (in other words, flat light-emitting element 100 and holder 200 are stacked when viewed in cross-section). For that reason, unless the width of each of holding parts 231, 232, 233, and 234 is sufficiently smaller than the length of holder 200 (frame portions 211 and 212) in the longitudinal direction, there are instances where failure occurs such as misalignment between flat light-emitting element 100 and holding parts 231, 232, 233, and 234, or failing to curve and remaining flat only in the portion where flat light-emitting element 100 and holding parts 231, 232, 233, and 234 overlap, when light-emitting device 10 is curved. In view of the above, the width of each of holding parts 231, 232, 233, and 234 of holder 200 is sufficiently smaller than the length of holder 200 (frame portions 211 and 212) in the longitudinal direction. With this configuration, it is possible to prevent the above-described failure from occurring.

Furthermore, in light-emitting device 10 according to the present exemplary embodiment, flat light-emitting device 100 and holder 200 are covered by first cover 300 and second cover 400. With this configuration, it is possible to protect flat light-emitting element 100 and holder 200. In particular, since the region where flat light-emitting element 100 and holder 200 are electrically and mechanically joined together is covered by first cover 300 and second cover 400, it is possible to prevent deterioration in the region where flat light-emitting element 100 and holder 200 are joined together.

According to the present exemplary embodiment, first cover 300 and second cover 400 are held slidably with respect to flat light-emitting element 100 and holder 200. With this configuration, even when light-emitting device 10 is curved, first cover 300 and second cover 400 do not interfere with curving and deformation of flat light-emitting element 100 and holder 200. Accordingly, it is possible to protect flat light-emitting element 100 by first cover 300 and second cover 400, while preventing damage to flat light-emitting element 100.

Furthermore, airplane 1 according to the present exemplary embodiment includes thin light-emitting device 10 which has flexibility and can be curved. With this configuration, the weight of airplane 1 can be reduced, and thus it is possible to lower the cost for fuel.

(First Modification of the First Exemplary Embodiment)

Next, light-emitting device 10A according to a first modification of the first exemplary embodiment will be described with reference to FIG. 6A and FIG. 6B.

Light-emitting device 10A according to the first modification differs light-emitting device 10 according to the above-described first exemplary embodiment in a configuration of the holder.

Figure 6A:
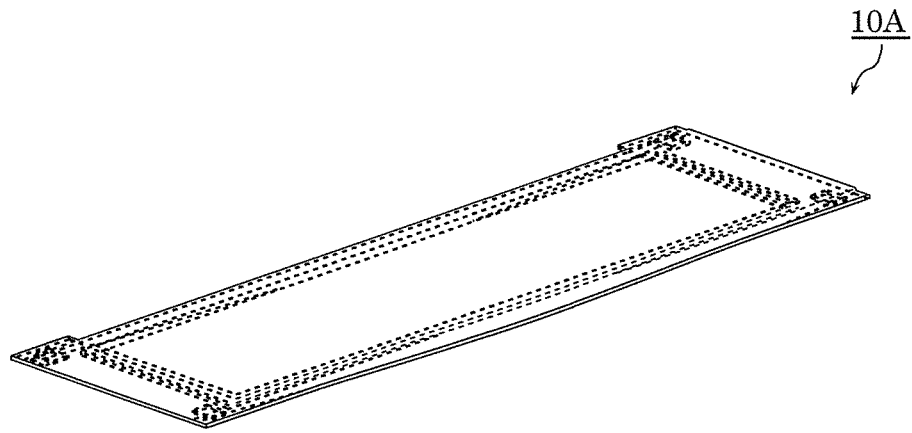
FIG. 6A is a perspective view of the light-emitting device according to a first modification of the first exemplary embodiment.
Figure 6B:
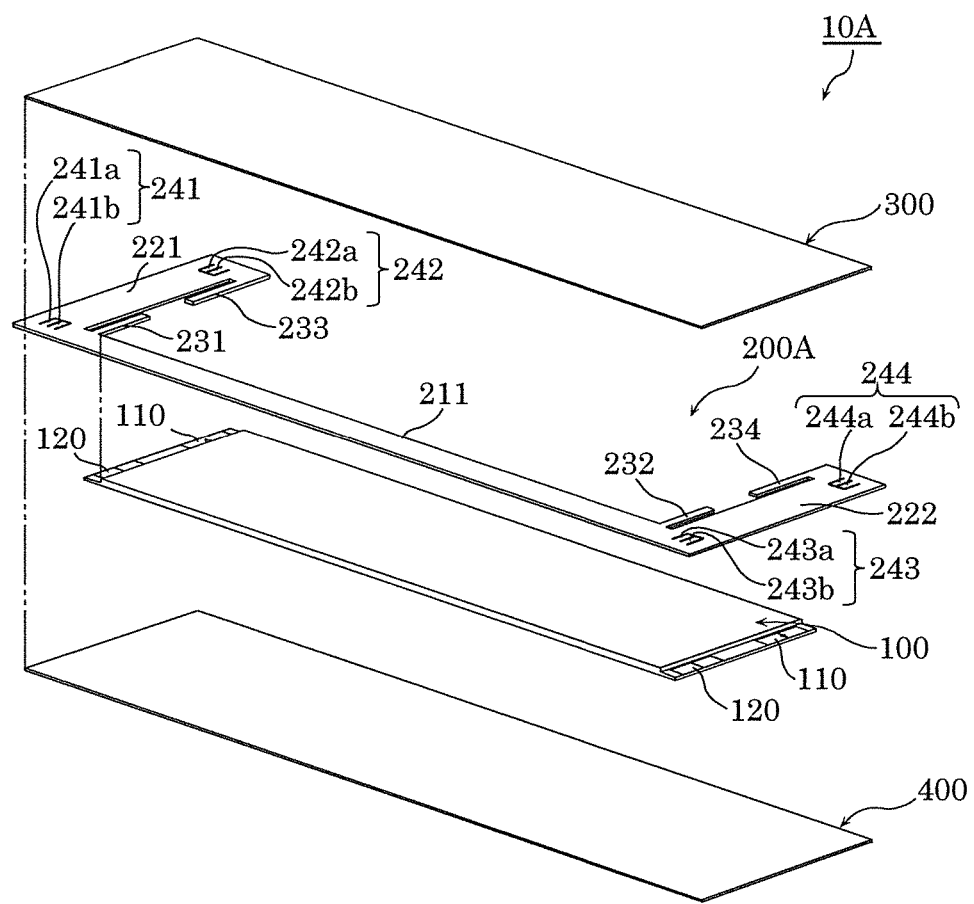
FIG. 6B is an exploded perspective view of the light-emitting device according to the first modification of the first exemplary embodiment.

As illustrated in FIG. 6A and FIG. 6B, holder 200A according to the first modification includes three frames; that is, frame portions 211, 221, and 222. In other words, light-emitting device 10A according to the first modification has mostly the same configuration as the configuration of light-emitting device 10 according to the first exemplary embodiment, however, frame portion 212 is not included therein. It is to be noted that holder 200A according to the first modification has a U-shape in a plan view.

With light-emitting device 10A according to the first modification as well, it is possible to produce an advantageous effect equivalent to light-emitting device 10 according to the above-described first exemplary embodiment.

(Second Modification of the First Exemplary Embodiment)

Next, light-emitting device 10B according to a second modification of the first exemplary embodiment will be described with reference to FIG. 7A and FIG. 7B.

Light-emitting device 10B according to the second modification differs light-emitting device 10 according to the above-described first exemplary embodiment in a configuration of the holder.

Figure 7A:
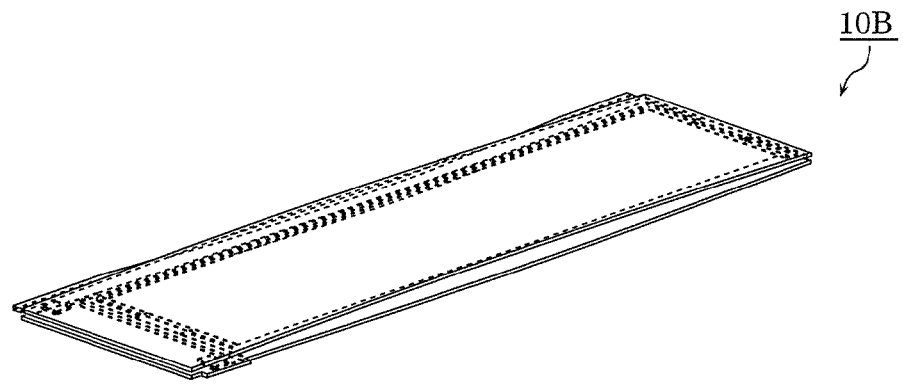
FIG. 7A is a perspective view of the light-emitting device according to a second modification of the first exemplary embodiment.
Figure 7B:
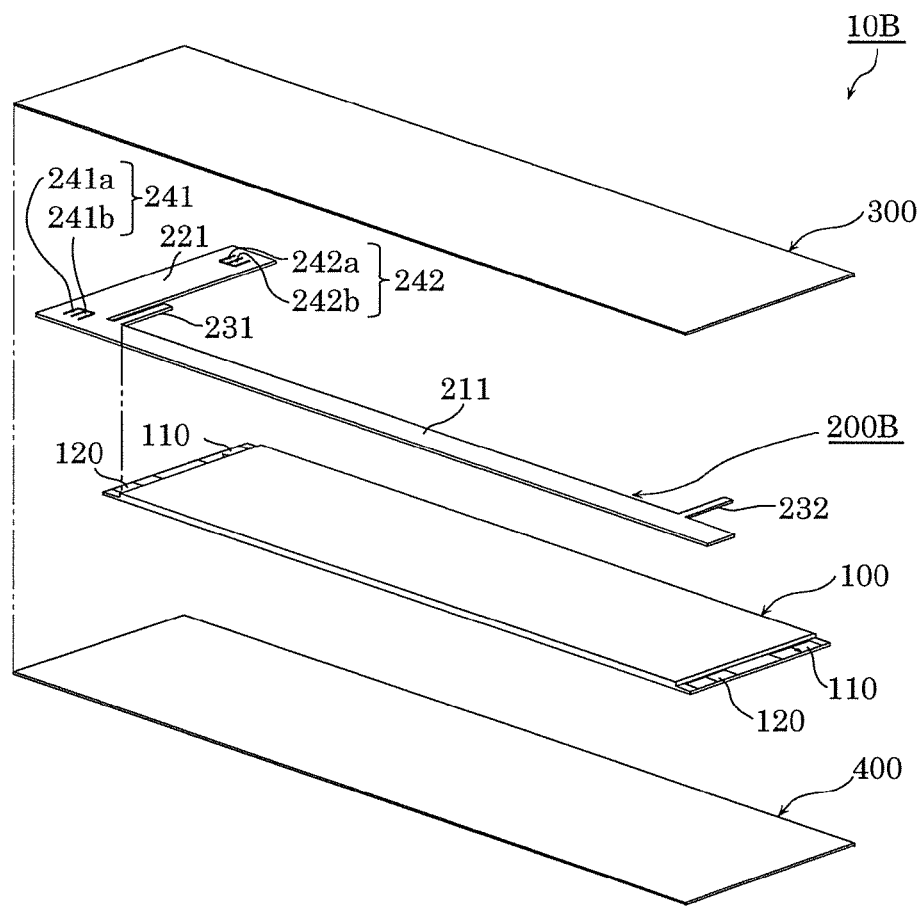
FIG. 7B is an exploded perspective view of the light-emitting device according to the second modification of the first exemplary embodiment.

As illustrated in FIG. 7A and FIG. 7B, holder 200B according to the second modification includes two frames; that is, frame portions 211 and 221. In other words, light-emitting device 10B according to the second modification has mostly the same configuration as the configuration of light-emitting device 10 according to the first exemplary embodiment, however, frame portions 212 and 222 are not included therein. It is to be noted that holder 200B according to the second modification has an L-shape in a plan view.

With light-emitting device 10B according to the second modification as well, it is possible to produce an advantageous effect equivalent to light-emitting device 10 according to the above-described first exemplary embodiment.

(Third Modification of the First Exemplary Embodiment)

Next, light-emitting device 10C according to a third modification of the first exemplary embodiment will be described with reference to FIG. 8A and FIG. 8B.

Light-emitting device 10C according to the third modification differs light-emitting device 10 according to the above-described first exemplary embodiment in a configuration of the holder.

Figure 8A:
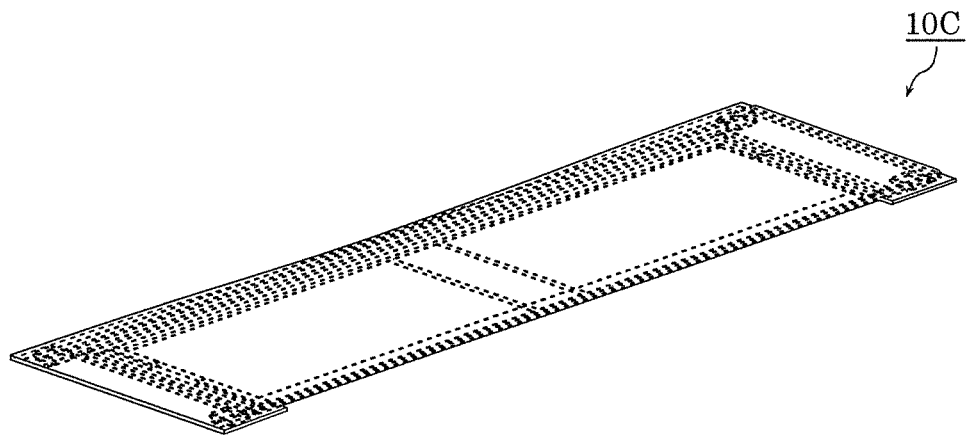
FIG. 8A is a perspective view of the light-emitting device according to a third modification of the first exemplary embodiment.
Figure 8B:
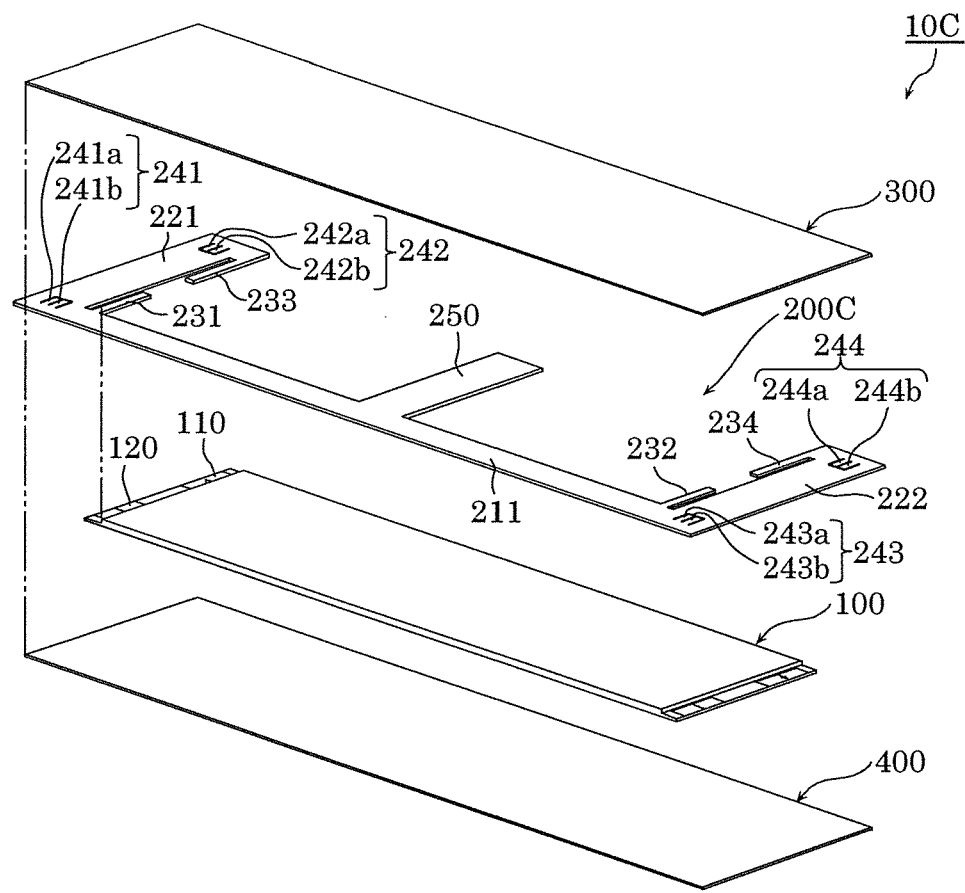
FIG. 8B is an exploded perspective view of the light-emitting device according to the third modification of the first exemplary embodiment.

As illustrated in FIG. 8A and FIG. 8B, holder 200C according to the third modification includes three frames; that is, frame portions 211, 221, and 222, and further includes a beam portion (holding beam) 250 which holds flat light-emitting element 100. Holder 200C according to the third modification has an E-shape in a plan view. It is to be noted that holder 200C includes holding parts 231 to 234 as with the first exemplary embodiment.

Beam portion 250 is a protruding portion that protrudes from a side of frame portion 211 toward the inside of holder 200. More specifically, beam portion 250 is formed integrally with frame portion 211 by extending part of frame portion 211. According to the third modification, beam portion 250 extends from a center portion of frame portion 211 in the longitudinal direction. In other words, beam portion 250 is provided at the center portion of frame portion 211 in the longitudinal direction. Accordingly, beam portion 250 holds an intermediate portion of flat light-emitting element 100 in the longitudinal direction.

In this case, holder 200C and flat light-emitting element 100 are combined such that beam portion 250 is positioned on a back side of flat light-emitting element 100, and it is thus possible to join beam portion 250 to a non-luminous surface (back surface) of flat light-emitting element 100. With this configuration, beam portion 250 is capable of holding flat light-emitting element 100 as well without affecting light emitted from flat light-emitting element 100.

Meanwhile, holder 200C and flat light-emitting element 100 may be combined such that beam portion 250 is positioned on the front surface of flat light-emitting element 100. In other words, beam portion 250 may come in contact with the luminous surface (front surface) of flat light-emitting element 100. With this configuration, since it is possible to sandwich flat light-emitting element 100 between beam portion 250 and frame portions 221 and 222, flat light-emitting element 100 can be held effectively without bonding, etc. beam portion 250 and flat light-emitting element 100. More specifically, beam portion 250 and flat light-emitting element 100 can move independently of each other in this case.

In the third modification, beam portion 250 is supported by frame portion 211 at only one end in the longitudinal direction, and the other end in the longitudinal direction is a free open end. In other words, beam portion 250 is a cantilever support beam.

In addition, beam portion 250 is an elongate rectangle in a plan view, and the longitudinal direction of beam portion 250 is perpendicular to the longitudinal direction of frame potion 211. The width of beam portion 250 (the length of beam portion 250 in the shorter side direction) is sufficiently shorter than the length of holder 200C (frame potion 211) in the longitudinal direction. In sum, the width of beam portion 250 is sufficiently shorter than the length of flat light-emitting element 100 in the longitudinal direction. The width of beam portion 250 according to the third modification is substantially the same as the width of frame portions 221 and 222 and greater than the width of holding parts 231 to 234. In addition, length of beam portion 250 in the longitudinal direction is substantially the same as the length of frame portion 221 in the longitudinal direction. It is to be noted that the thickness of beam portion 250 is the same as the thickness of frame potion 211.

With light-emitting device 10C according to the third modification as well, it is possible to produce an advantageous effect equivalent to light-emitting device 10 according to the above-described first exemplary embodiment.

In addition, according to the third modification, holder 200C includes beam portion 250 which holds flat light-emitting element 100. With this configuration, it is possible to sufficiently hold flat light-emitting element 100 even when frame portion 212 is not provided and holder 200 has only a modest holding capability.

(Fourth Modification of the First Exemplary Embodiment)

Next, light-emitting device 10D according to a fourth modification of the first exemplary embodiment will be described with reference to FIG. 9A and FIG. 9B.

Light-emitting device 10D according to the fourth modification differs light-emitting device 10 according to the above-described first exemplary embodiment in a configuration of each of the flat light-emitting element and the holder.

Figure 9A:
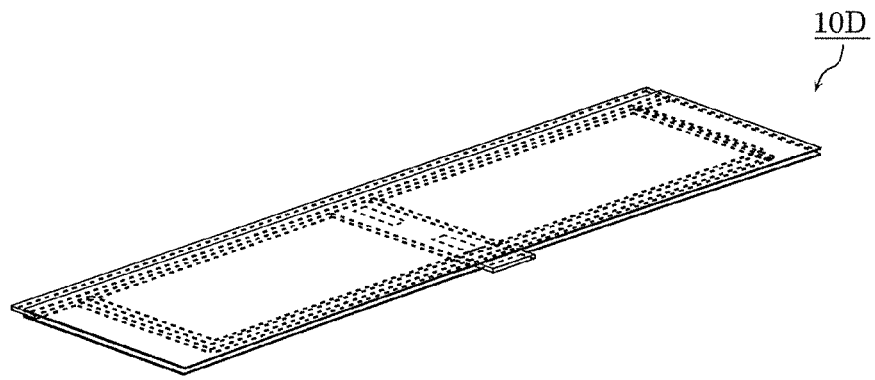
FIG. 9A is a perspective view of the light-emitting device according to a fourth modification of the first exemplary embodiment.
Figure 9B:
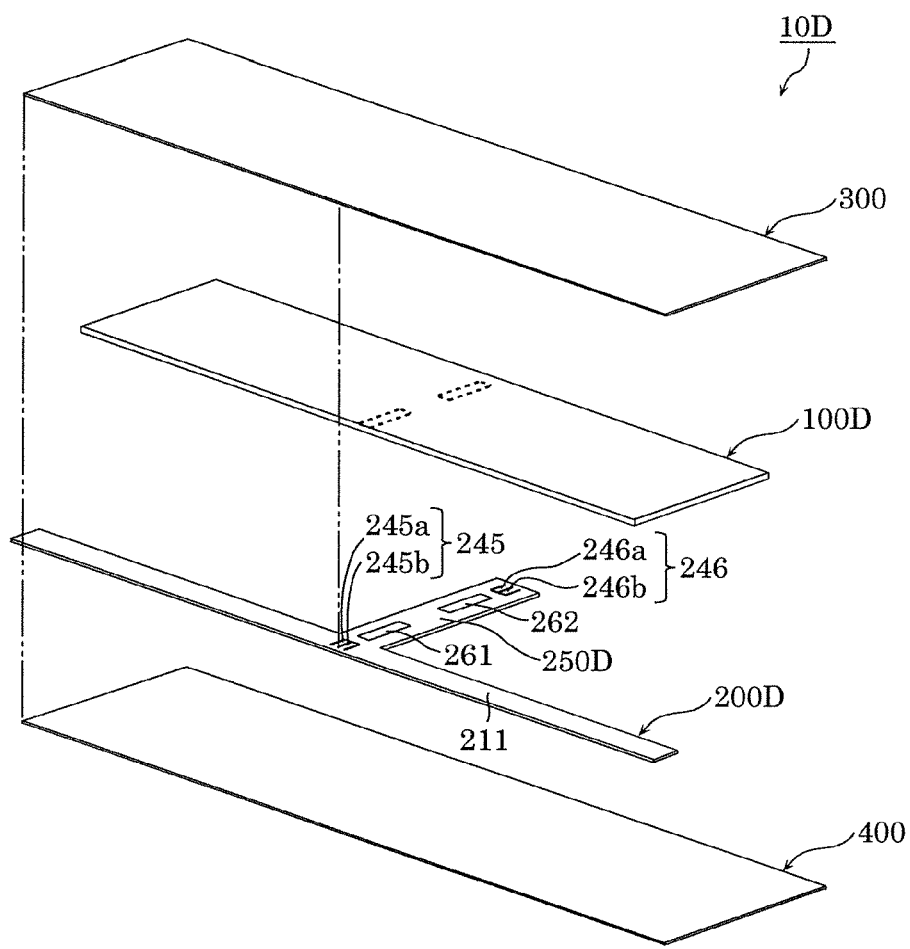
FIG. 9B is an exploded perspective view of the light-emitting device according to the fourth modification of the first exemplary embodiment.

As illustrated in FIGS. 9A and 9B, flat light-emitting element 100D according to the fourth modification is provided with a pair of power supply electrodes at the center portion of flat light-emitting element 100D in longitudinal direction.

In addition, holder 200D according to the forth modification includes frame portion 211 and beam portion 250D which holds flat light-emitting element 100D. It is to be noted that holder 200D according to the fourth modification has a T-shape in a plan view.

Beam portion 250D according to the fourth modification has the same shape as beam portion 250 according to the above-described third modification of the first exemplary embodiment. However, beam portion 250D according to the fourth modification further has a function of supplying power in addition to the functions of beam portion 250 according to the above-described third modification of the first exemplary embodiment.

More specifically, as illustrated in FIG. 9B, beam portion 250D according to the fourth modification is provided, on the surface, with power supply units (power supply bodies) 261 and 262 capable of supplying power to flat light-emitting element 100. Power supply units 261 and 262 are electrically and mechanically connected to power supply electrodes of flat light-emitting element 100D. More specifically, a pair of power supply electrodes provided at the center portion of flat light-emitting element 100D and a pair of power supply units 261 and 262 are electrically and mechanically connected in the region where beam portion 250D of holder 200D and flat light-emitting element 100D are joined together. For example, power supply units 261 and 262 may be indirectly connected to power supply electrodes via a conductive adhesive such as solder (by solder jointing), or may be directly connected by ultrasonic jointing, welding, or the like.

It is to be noted that beam portion 250D according to the fourth modification serves as a holding part which holds flat light-emitting element 100 as with holding parts 231 to 234 according to the first exemplary embodiment. In other words, flat light-emitting element 100 is held by being joined to beam portion 250D.

With light-emitting device 10D according to the fourth modification as well, it is possible to produce an advantageous effect equivalent to light-emitting device 10 according to the above-described first exemplary embodiment.

(Fifth Modification of the First Exemplary Embodiment)

Next, light-emitting device 10E according to a fifth modification of the first exemplary embodiment will be described with reference to FIG. 10A and FIG. 10B.

Light-emitting device 10E according to the fifth modification differs light-emitting device 10 according to the above-described first exemplary embodiment in a configuration of the holder.

Figure 10A:
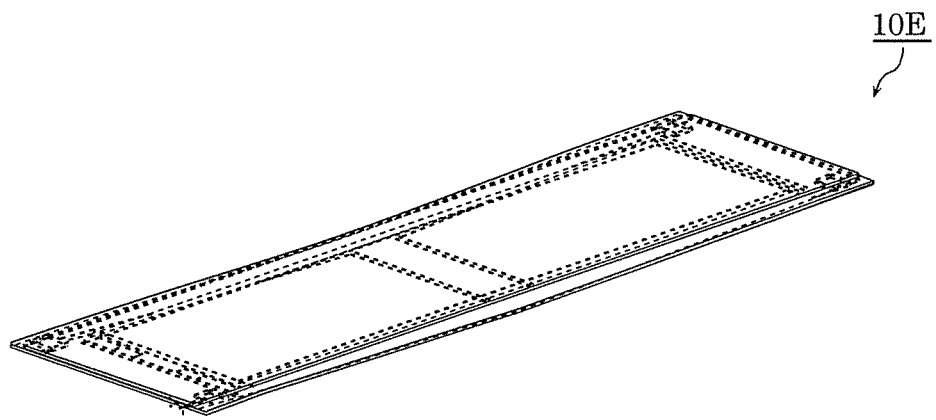
FIG. 10A is a perspective view of the light-emitting device according to a fifth modification of the first exemplary embodiment.
Figure 10B:
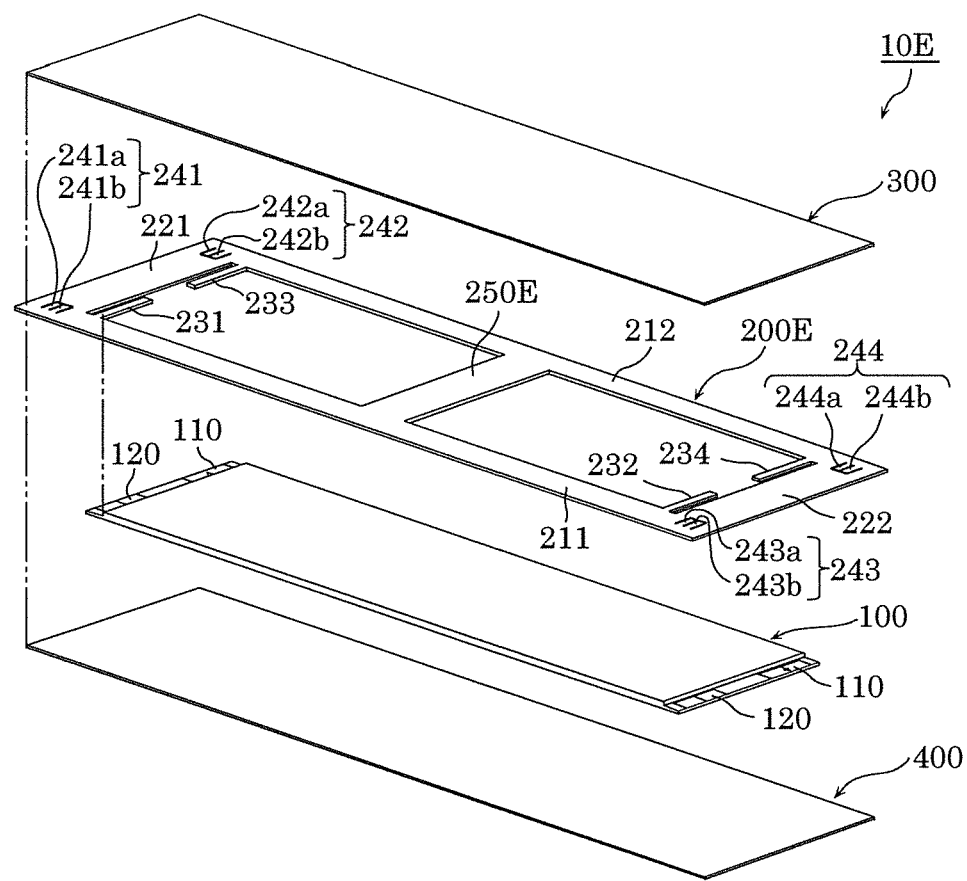
FIG. 10B is an exploded perspective view of the light-emitting device according to the fifth modification of the first exemplary embodiment.

As illustrated in FIG. 10A and FIG. 10B, holder 200E according to the fifth modification further includes beam portion 250E which holds flat light-emitting element 100, in addition to the configuration of holder 200 according to the above-described first exemplary embodiment. In other words, light-emitting device 10E according to the fifth modification includes beam portion 250E in addition to the configuration of light-emitting device 10 according to the first exemplary embodiment. It is to be noted that holder 200E according to the fifth modification has a shape of a two-pane window in a plan view.

Beam portion 250E has a shape similar to the shape of beam portion 250 according to the third modification of the first exemplary embodiment. However, since holder 200 according to the fifth modification is provided with frame portion 212, beam portion 250E is disposed to stretch between the pair of opposed frame portions 211 and 212. Beam portion 250E is formed integrally with frame portions 211 and 212, and extends from a center portion in the longitudinal direction of frame portions 211 and 212.

It is to be noted that, as with beam portion 250 according to the third modification of the first exemplary embodiment, holder 200E and flat light-emitting element 100 may be combined such that beam portion 250E is positioned on a back side of flat light-emitting element 100 or such that beam portion 250E is positioned on a front side of flat light-emitting element 100.

With light-emitting device 10E according to the fifth modification as well, it is possible to produce an advantageous effect equivalent to light-emitting device 10 according to the above-described first exemplary embodiment.

In addition, according to the fifth modification, holder 200E includes beam portion 250E which holds flat light-emitting element 100. With this configuration, it is possible to hold flat light-emitting element 100 with more stability than in the case of the first exemplary embodiment.

(Second Exemplary Embodiment)

Next, light-emitting device 10F according to a second exemplary embodiment will be described with reference to FIG. 11A and FIG. 11B.

Light-emitting device 10F according to the present exemplary embodiment differs light-emitting device 10 according to the above-described first exemplary embodiment in configurations of the holder, the first cover, and the second cover. Holder 200 holds not only flat light-emitting element 100 but also first cover 300 and second cover 400 according to the above-described first exemplary embodiment. However, holder 200F according to the present exemplary embodiment holds only flat light-emitting element 100. Flat light-emitting element 100 and holder 200 are held by first cover 300F and second cover 400F according to the present exemplary embodiment.

Figure 11A:
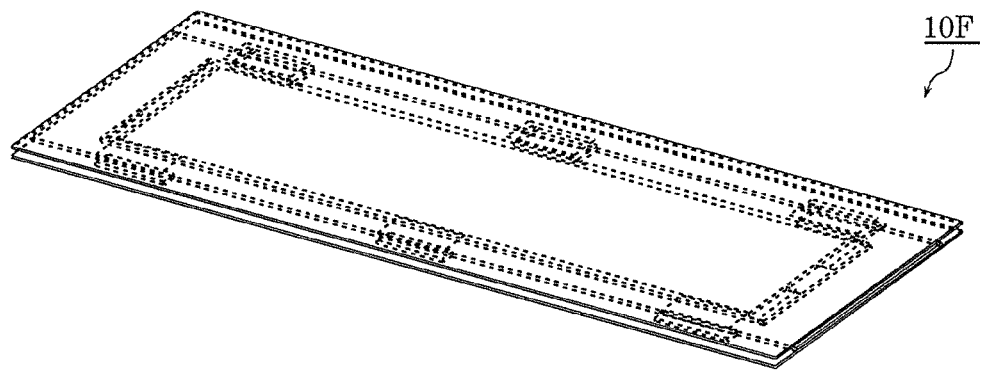
FIG. 11A is a perspective view of the light-emitting device according to a second exemplary embodiment.
Figure 11B:
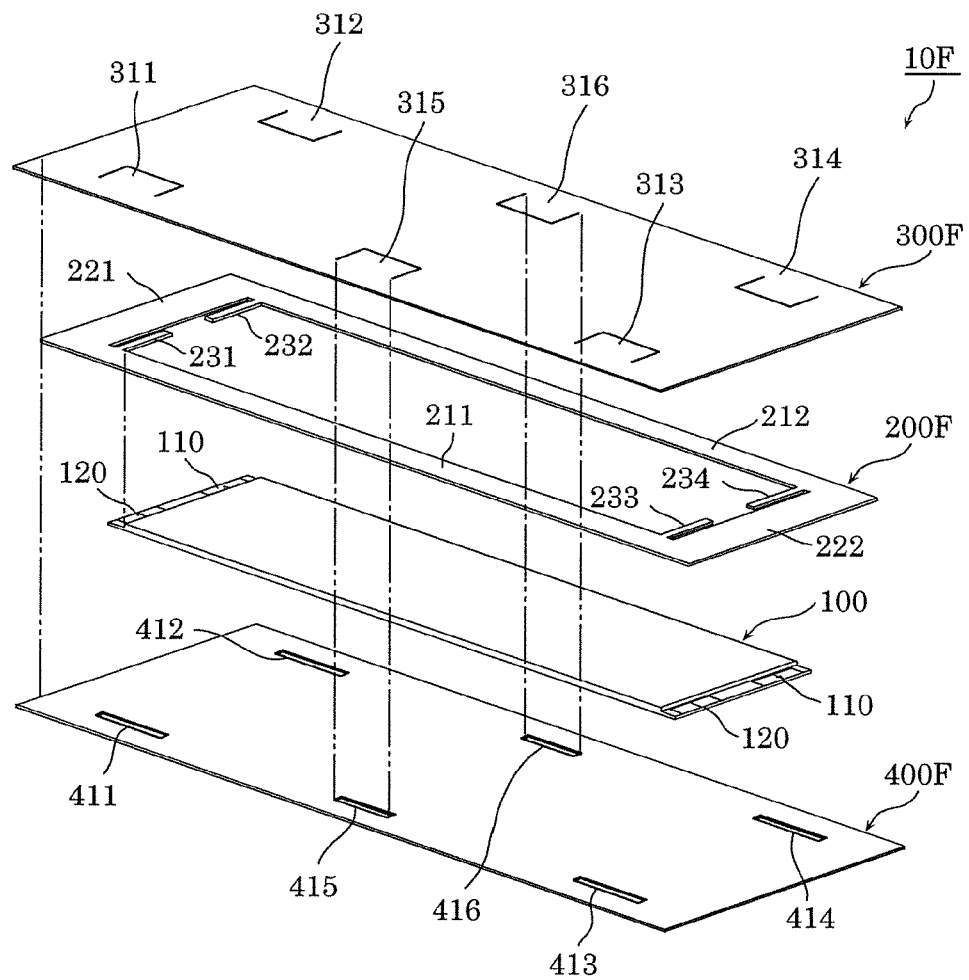
FIG. 11B is an exploded perspective view of the light-emitting device according to the second exemplary embodiment.

More specifically, as illustrated in FIG. 11A and FIG. 11B, holder 200F according to the present exemplary embodiment has mostly the same configuration as the configuration of holder 200 according to the first exemplary embodiment, however, holding pieces 241 to 246 are not included therein Furthermore, first cover 300F includes a plurality of holding pieces (engage pieces) 311 to 316 which hold holder 200F. Holding pieces 311 to 316 are each formed integrally with first cover 300F, and formed by making a slit in part of first cover 300F according to the present exemplary embodiment. More specifically, each of holding pieces 311 to 316 is formed by making a U-shaped slit in first cover 300F, and has a claw-shape which allows cutting and raising part of first cover 300F.

Holding pieces 311, 313, and 315 hold frame portion 211 and one longitudinal end portion of flat light-emitting element 100. Among holding pieces 311, 313, and 315, holding pieces 311 and 313 hold the both end portions in the longitudinal direction of frame potion 211, and holding piece 315 holds the center portion in the longitudinal direction of frame potion 211.

In contrast, holding pieces 312, 314, and 316 hold frame portion 212 and the other longitudinal end portion of flat light-emitting element 100. Among holding pieces 312, 314, and 316, holding pieces 312 and 314 hold the both end portions in the longitudinal direction of frame potion 212, and holding piece 316 holds the center portion in the longitudinal direction of frame potion 212.

Furthermore, second cover 400F includes engage openings 411 to 416 which engage holding pieces 311 to 316. Engage openings 411 to 416 are each a slit-like opening resulting from cutting out part of second cover 400F. Holding pieces 311 to 316 of first cover 300F are inserted into engage openings 411 to 416, respectively. More specifically, holding pieces 311 to 316 of first cover 300F are engaged to second cover 400F by being inserted into engage openings 411 to 416 of second cover 400F.

According to the present exemplary embodiment, the longitudinal length of holding piece 311 and engage opening 411 which are provided at one end portion in the longitudinal direction is greater than the length of holding piece 315 and engage opening 415 which are provided at the center portion in the longitudinal direction.

In addition, the longitudinal length of holding piece 313 and engage opening 413 which are provided at the other end portion in the longitudinal direction is greater than the length of holding piece 315 and engage opening 415 which are provided at the center portion in the longitudinal direction.

Likewise, the longitudinal length of holding pieces 312 and 314, and engage openings 412 and 414 is greater than the length of holding piece 316 and engage opening 416 which are provided at the center portion in the longitudinal direction.

As described above, with light-emitting device 10F according to the present exemplary embodiment as well, since holder 200F is included, it is possible to produce an advantageous effect equivalent to light-emitting device 10 according to the above-described first exemplary embodiment.

In addition, unlike the above-described first exemplary embodiment, flat light-emitting device 100 and holder 200F are held by first cover 300F and second cover 400F in light-emitting device 10F according to the present exemplary embodiment.

In this case, first cover 300F and second cover 400F are not fixed using adhesives, and first cover 300F and second cover 400F are slidable with respect to flat light-emitting element 100 and holder 200F.

More specifically, holding pieces 311 to 316 of first cover 300F are engaged to engage openings 411 to 416 of second cover 400F, thereby coupling cover 300F and second cover 400F. With this configuration, first cover 300F and second cover 400F are slidable with respect to flat light-emitting element 100 and holder 200F, and thus capable of moving independently of each other when light-emitting device is curved.

Accordingly, even when light-emitting device 10F is curved, first cover 300F and second cover 400F do not interfere with curving and deformation of flat light-emitting element 100 and holder 200F. It is thus possible to protect flat light-emitting element 100 by first cover 300F and second cover 400F, while preventing damage to flat light-emitting element 100.

Furthermore, when light-emitting device 10F is curved, first cover 300F and second cover 400F easily slide according to the present exemplary embodiment.

When light-emitting device 10F is curved, the amount of misalignment of first cover 300F and second cover 400F in the longitudinal direction of light-emitting device 10F is larger in the both end portions than in the center portion, in the longitudinal direction.

In view of the above, according to the present exemplary embodiment, the longitudinal length of holding pieces 311 to 314 and engage openings 411 to 414 which are provided on the both end portions in the longitudinal direction is greater than the longitudinal length of holding piece 315 and engage opening 415 provided on the center portion in the longitudinal direction.

With this configuration, it is possible to absorb the amount of misalignment of first cover 300F and second cover 400F when light-emitting device 10F is curved, and thus first cover 300F and second cover 400F can slide when light-emitting device 10F is curved. It is thus possible to protect flat light-emitting element 100 by first cover 300F and second cover 400F, while preventing damage to flat light-emitting element 100.

(First Modification of the Second Exemplary Embodiment)

Next, light-emitting device 10G according to a first modification of the second exemplary embodiment will be described with reference to FIG. 12A and FIG. 12B.

Light-emitting device 10G according to the first modification differs light-emitting device 10F according to the above-described second exemplary embodiment in configurations of the first cover and the second cover.

Figure 12A:
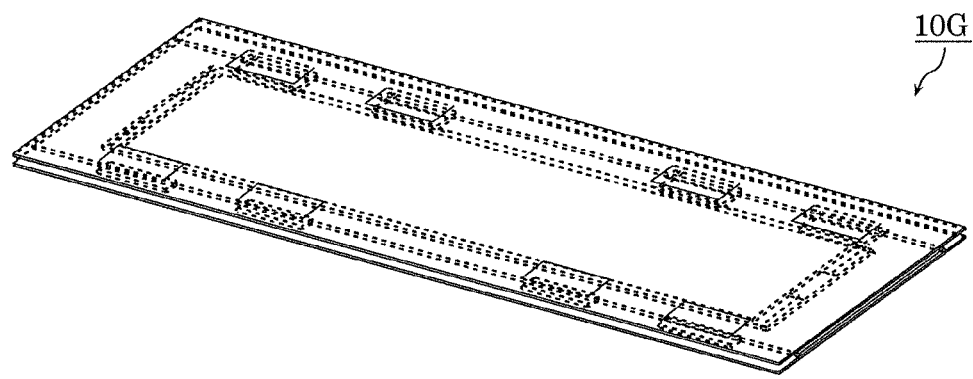
FIG. 12A is a perspective view of the light-emitting device according to a first modification of the second exemplary embodiment.
Figure 12B:
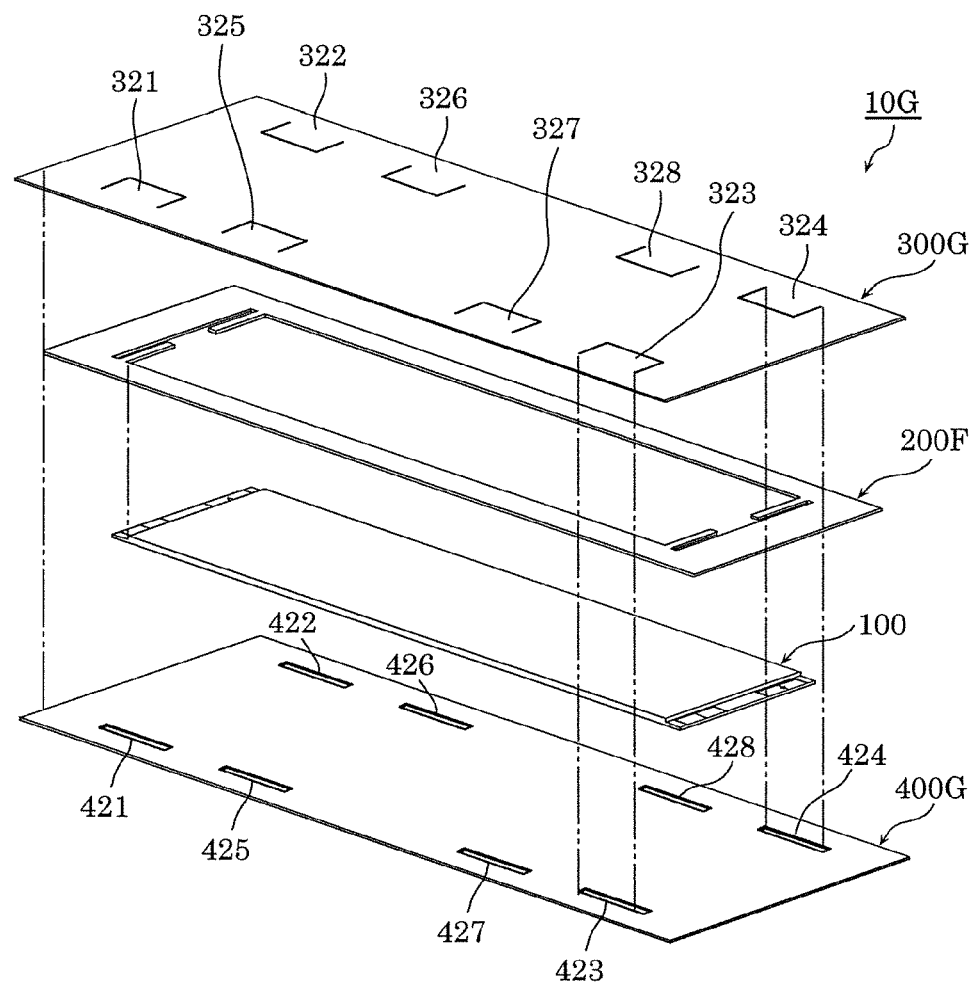
FIG. 12B is an exploded perspective view of the light-emitting device according to the first modification of the second exemplary embodiment.

As illustrated in FIG. 12A and FIG. 12B, first cover 300G according to the first modification includes holding pieces (engage pieces) 321 to 328 which hold holder 200F, as with the above-described second exemplary embodiment. However, holding pieces 321 to 328 are not provided at the center portion in the longitudinal direction of first cover 300G according to the first modification.

In addition, second cover 400G according to the first modification includes, as with the above-described second exemplary embodiment, engage openings 421 to 428. However, engage openings 421 to 428 are not provided at the center portion in the longitudinal direction of second cover 400G according to the first modification.

As described above, with light-emitting device 10G according to the first modification as well, since holder 200F is included, it is possible to produce an advantageous effect equivalent to light-emitting device 10F according to the above-described second exemplary embodiment.

In addition, according to the first modification, holding pieces 321 to 328 are not provided at the center portion of first cover 300G in the longitudinal direction, and engage openings 421 to 428 are not provided at the center portion of second cover 400G in the longitudinal direction.

With this configuration, even in the case where first cover 300G and second cover 400G are coupled, it is possible for first cover 300G and second cover 400G to slide in the longitudinal direction when light-emitting device 10G is curved. Accordingly, it is possible to protect flat light-emitting element 100 by first cover 300G and second cover 400G, while preventing damage to flat light-emitting element 100.

(Second Modification of the Second Exemplary Embodiment)

Next, light-emitting device 10H according to a second modification of the second exemplary embodiment will be described with reference to FIG. 13A and FIG. 13B.

Light-emitting device 10H according to the second modification differs light-emitting device 10F according to the above-described second exemplary embodiment in configurations of the first cover and the second cover.

Figure 13A:
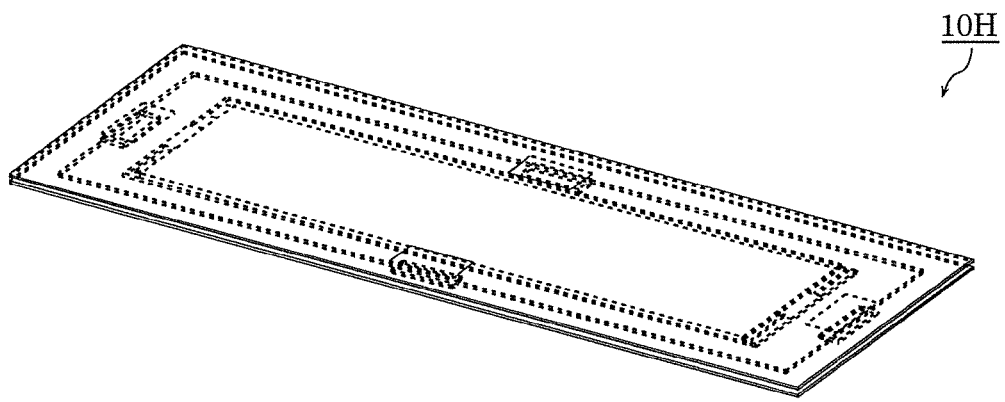
FIG. 13A is a perspective view of the light-emitting device according to a second modification of the second exemplary embodiment.
Figure 13B:
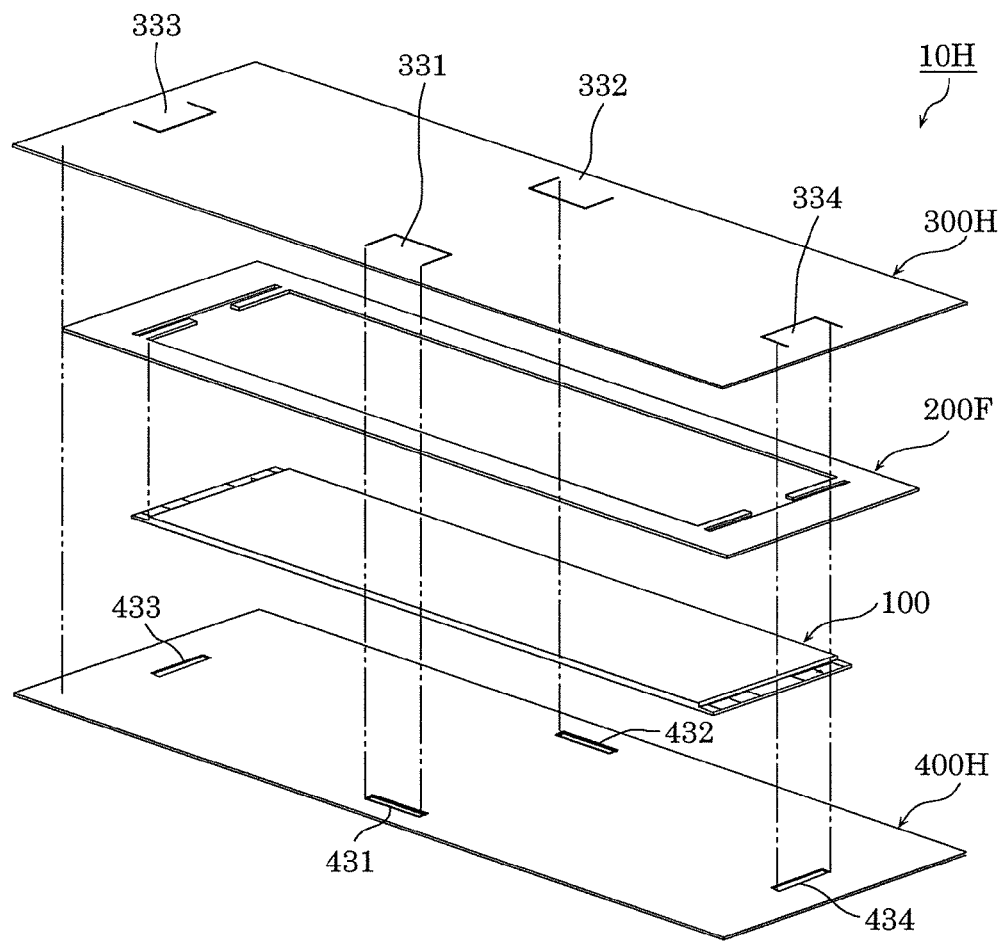
FIG. 13B is an exploded perspective view of the light-emitting device according to the second modification of the second exemplary embodiment.

As illustrated in FIG. 13A and FIG. 13B, first cover 300H according to the second modification includes, as with the above-described second exemplary embodiment, holding pieces (engage pieces) 331 to 334 which hold holder 200F. According to the second modification, however, holding pieces 331 to 334 are provided only at four positions; that is, the center portion in each of longitudinal sides and shorter sides of first cover 300H.

Furthermore, second cover 400H according to the second modification includes engage openings 431 to 434 as with the above-described second exemplary embodiment. According to the second modification, however, engage openings 431 to 434 are provided only at four positions; that is, the center portion in each of longitudinal sides and shorter sides of second cover 400H.

As described above, with light-emitting device 10H according to the second modification as well, since holder 200F is included, it is possible to produce an advantageous effect equivalent to light-emitting device 10F according to the above-described second exemplary embodiment.

In addition, according to the second modification, holding pieces 331 to 334 are provided only at four positions; that is, the center portion in each of the longitudinal sides and shorter sides of first cover 300H, and engage openings 431 to 434 are provided only at four positions; that is, the center portion in each of the longitudinal sides and shorter sides of second cover 400H.

With this configuration, even in the case where first cover 300H and second cover 400H are coupled, it is possible for first cover 300H and second cover 400H to easily slide in the longitudinal direction when light-emitting device 10H is curved. Accordingly, it is possible to protect flat light-emitting element 100 by first cover 300G and second cover 400G, while preventing damage to flat light-emitting element 100.

(Other Modifications, Etc.)

The light-emitting device and the mobile object according to the present disclosure have been described above, based on exemplary embodiments and modifications. However, the present disclosure is not limited to the above-described exemplary embodiments.

For example, although only one flat light-emitting element is disposed in the light-emitting device according to the above-described exemplary embodiments and modifications, a plurality of flat light-emitting elements may be disposed.

Figure 14:
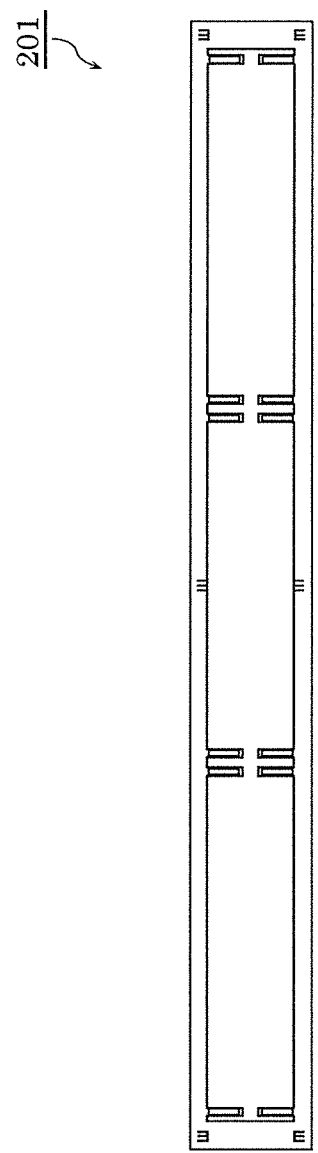
FIG. 14 is a plan view of a holder according to the first modification included in the light-emitting device.

For example, when a plurality of flat light-emitting elements 100 according to the first exemplary embodiment are arranged along the longitudinal direction, holder 201 as illustrated in FIG. 14 may be employed. Holder 201 has a shape in which a plurality of holders 200 according to the first exemplary embodiment are coupled together in the longitudinal direction, and is capable of holding the plurality of flat light-emitting elements 100 disposed along the longitudinal direction.

Figure 15:
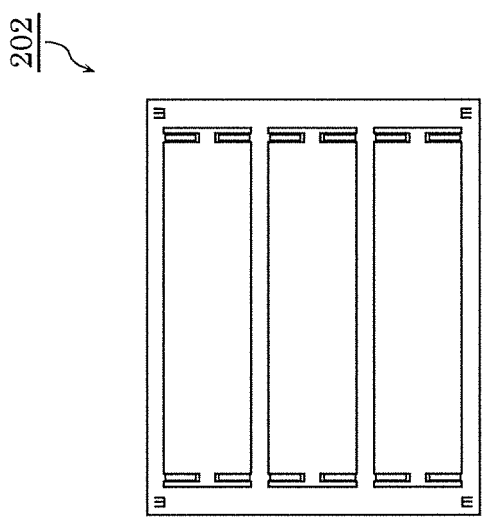
FIG. 15 is a plan view of a holder according to the second modification included in the light-emitting device.

In addition, when a plurality of flat light-emitting elements 100 according to the first exemplary embodiment are arranged along the shorter side direction, holder 202 as illustrated in FIG. 15 may be employed. Holder 202 has a shape in which a plurality of holders 200 according to the first exemplary embodiment are coupled together in the shorter side direction, and is capable of holding the plurality of flat light-emitting elements 100 disposed along the shorter side direction.

Figure 16:
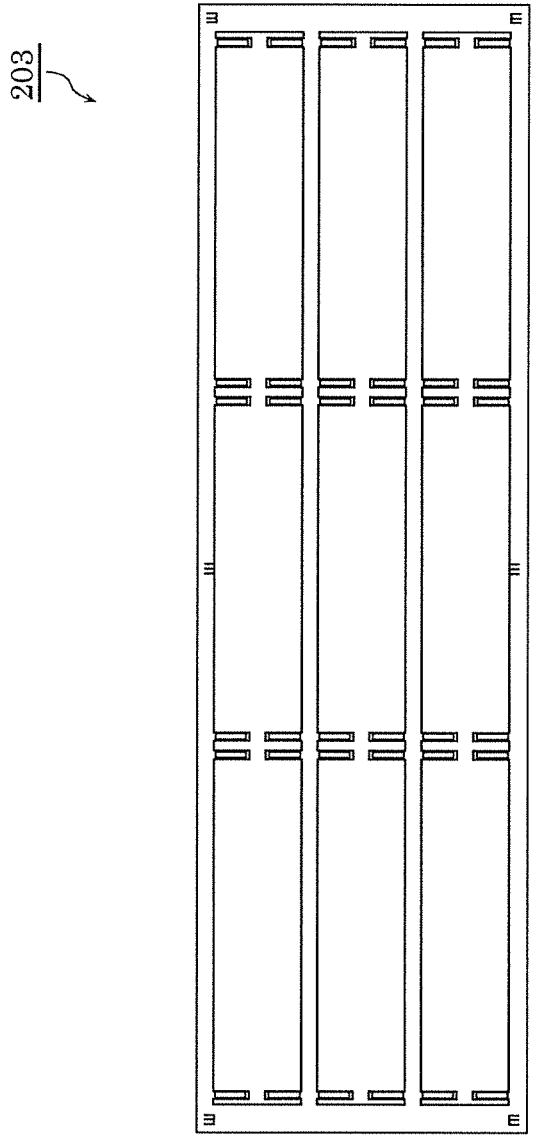
FIG. 16 is a plan view of a holder according to a third modification included in the light-emitting device.

In addition, when a plurality of flat light-emitting elements 100 according to the first exemplary embodiment are arranged in a matrix (tiled arrangement), holder 203 as illustrated in FIG. 16 may be employed. Holder 203 has a shape in which a plurality of holders 200 according to the first exemplary embodiment are coupled together in a matrix, and is capable of holding the plurality of flat light-emitting elements 100 disposed in a matrix. It is to be noted that, three flat light-emitting elements 100 are arranged in the row direction and in the column direction (3×3) in FIG. 16, the arrangement is not limited to this.

Figure 17:
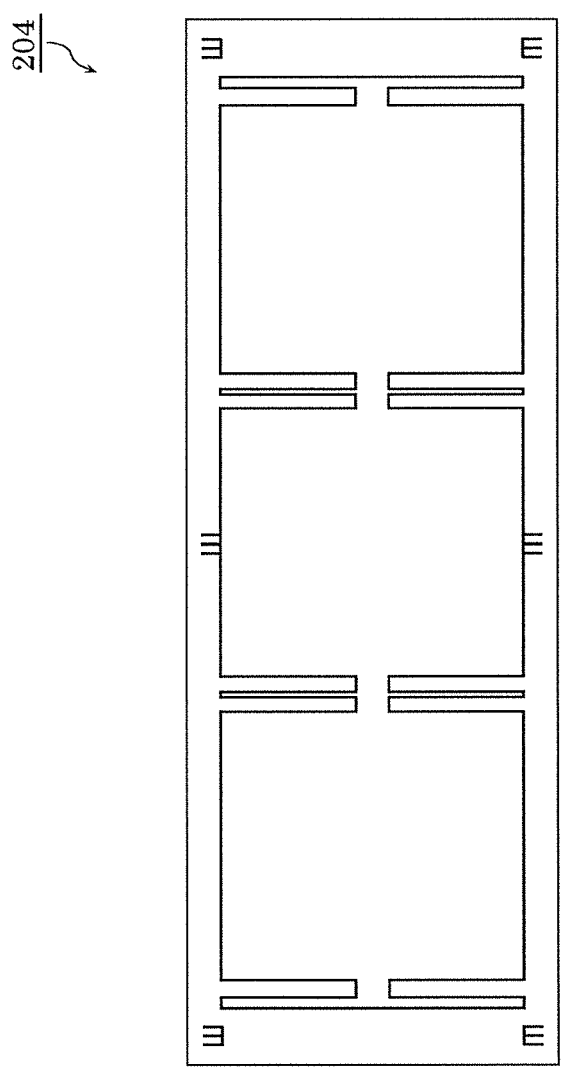
FIG. 17 is a plan view of a holder according to a fourth modification included in the light-emitting device.

In addition, a plurality of flat light-emitting elements which is square in a plan view may be disposed instead of flat light-emitting elements having an elongate shape, and in this case, holder 204 as illustrated in FIG. 17 may be employed. Holder 204 has a shape which allows holding of a plurality of square flat light-emitting elements.

In addition, although an illumination apparatus has been described as an example of the light-emitting device in the above-described exemplary embodiments and modifications, the light-emitting device is not limited to this. For example, the light-emitting device according to the exemplary embodiments and modifications may be a signage, a display apparatus, or the like.

In addition, although the case where a light-emitting device is applied to an airplane has been described in the above-described exemplary embodiments and modifications, the case is not limited to this. For example, a light-emitting device according to the above-described exemplary embodiments and modifications may be applied to a mobile object other than an airplane, such as a vehicle and a train.

In addition, although the case where a light-emitting device is attached to a curved portion in a room of a mobile object has been described in the above-described exemplary embodiments and modifications, the light-emitting device may be attached to a curved portion outside the mobile object. Furthermore, the light-emitting device may be attached not to a mobile object but to a structural object other than a mobile object.

Moreover, embodiments obtained through various modifications to the respective exemplary embodiments which may be conceived by a person skilled in the art as well as embodiments realized by arbitrarily combining the constituent elements and functions of the respective exemplary embodiments without materially departing from the spirit of the present disclosure are included in the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light-emitting device comprising:
a holder having an elongate shape and flexibility; and
a flat light-emitting element held by the holder and having a rectangular shape and flexibility, the flat light-emitting element comprising:
a pair of substrates;
a pair of electrodes disposed between the pair of substrates and electrically connected to an anode and cathode;
an extraction electrode extracted from each electrode of the pair of electrodes; and
a light-emitting layer disposed between the pair of electrodes; wherein:
the holder includes a frame extending in a longitudinal direction of the holder in a plan view, and a beam protruding from the frame and extending across the top of the light emitting layer in a latitudinal direction of the holder in a plan view and wherein the beam is configured to supply power to the flat light-emitting element via power supply units disposed on the beam,
the frame of the holder and the beam overlap the light emitting element in an orthogonal direction in a plan view,
the flat light-emitting element is joined to the frame and beam by a plurality of holding pieces, and
the extraction electrodes are electrically and mechanically connected to the power supply units in a region where the power supply units and the flat light-emitting element are joined together.

2. The light-emitting device according to claim 1, wherein:
the beam comprises at least two beams each configured to supply power to the flat light-emitting element,
the extraction electrode is disposed on both end portions of the flat light-emitting element in the longitudinal direction, and
the extraction electrode and the beam are joined together in one-to-one correspondence.

3. The light-emitting device according to claim 1, wherein the extraction electrode is disposed on a center portion of the flat light-emitting element in the longitudinal direction.

4. The light-emitting device according to claim 1, wherein:
the beam is formed integrally with the frame, and
the beam holds the flat light-emitting element.

5. The light-emitting device according to claim 4, wherein the beam holds an intermediate section of the flat light-emitting element in the longitudinal direction.

6. The light-emitting device according to claim 1, wherein the holder has a shape of a rectangular frame.

7. The light-emitting device according to claim 1, further comprising
a first cover which is transmissive and covers one face of the flat light-emitting element.

8. The light-emitting device according to claim 7, further comprising
a second cover which covers an other face of the flat light-emitting element.

9. The light-emitting device according to claim 8, wherein the first cover covers both of the flat light-emitting element and the holder, and
includes a tab which holds the frame.

10. The light-emitting device according to claim 9, wherein an engage opening for engaging the tab is defined in the second cover.

11. The light-emitting device according to claim 10, wherein:
- the tab comprises a plurality of tabs positioned along the longitudinal direction of the holder,
- the engage opening comprises a plurality of engage openings positioned along the longitudinal direction of the holder, and
- a longitudinal length of each engage opening of the plurality of engage openings positioned at end portions of the second cover in the longitudinal direction is greater than a longitudinal length of the engage opening of the plurality of engage openings positioned at a center portion of the second cover in the longitudinal direction.

12. The light-emitting device according to claim 7, wherein the holder includes a tab which holds the first cover, and
the tab is disposed on the frame.

13. The light-emitting device according to claim 12, wherein the tab is disposed on a center portion of the frame in the longitudinal direction.

14. The light-emitting device according to claim 1, wherein the holder has a shape which allows holding of a plurality of the flat light-emitting elements along the longitudinal direction of the holder.

15. A mobile object comprising
the light-emitting device according to claim 1,
wherein the light-emitting device is attached to a curved portion in or outside a room, with the holder and the flat light-emitting element being curved.

* * * * *